(12) United States Patent
Mizoi et al.

(10) Patent No.: US 12,534,006 B2
(45) Date of Patent: Jan. 27, 2026

(54) VEHICLE SEAT

(71) Applicant: TS TECH CO., LTD., Asaka (JP)

(72) Inventors: Kensuke Mizoi, Tochigi (JP);
Ryuzaburo Abe, Tochigi (JP); Kenichi Niitsuma, Tochigi (JP); Soichiro Tanaka, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 0 days.

(21) Appl. No.: 18/588,070

(22) Filed: Feb. 27, 2024

(65) Prior Publication Data

US 2024/0190313 A1  Jun. 13, 2024

Related U.S. Application Data

(63) Continuation of application No. 18/316,268, filed on May 12, 2023, now Pat. No. 11,945,350, which is a
(Continued)

(30) Foreign Application Priority Data

May 19, 2014  (JP) ................................. 2014-103593

(51) Int. Cl.
*B60N 2/90* (2018.01)
*B60N 2/02* (2006.01)
(Continued)

(52) U.S. Cl.
CPC ........... *B60N 2/665* (2015.04); *B60N 2/0284* (2013.01); *B60N 2/64* (2013.01); *B60N 2/80* (2018.02);
(Continued)

(58) Field of Classification Search
CPC . B60N 2/665; B60N 2/64; B60N 2/99; B60N 2/914; B60N 2/995; B60N 2/80; B60N 2/0284
See application file for complete search history.

(56) References Cited

U.S. PATENT DOCUMENTS 4,459,714 A    7/1984 Lin
5,280,997 A *  1/1994 Andres .................. A47C 7/467
                                               297/284.6
(Continued)

FOREIGN PATENT DOCUMENTS

JP    H05-115335 A    5/1993
JP    H06-082949 U   11/1994
(Continued)

*Primary Examiner* — Philip F Gabler
(74) *Attorney, Agent, or Firm* — Michael Best & Friedrich LLP

(57) ABSTRACT

Provided is to stabilize a fixed state of each bag body provided at a vehicle seat and configured to expand to push a corresponding one of the shoulders of a seated passenger. Of a seat back provided at the vehicle seat, each shoulder support configured to support a corresponding one of the shoulders of the seated passenger includes an air cell configured to expand by injection of air. The air cell includes protrusions extending in a predetermined direction and provided at respective end portions of the air bag in the extending direction thereof. The air cell is attached to the inside of the seat back in such a manner that each of the protrusions provided at respective end portions in the extending direction is fixed to a corresponding one of fixing positions separated from each other in the width direction of the vehicle seat.

1 Claim, 15 Drawing Sheets

Related U.S. Application Data continuation of application No. 17/156,829, filed on Jan. 25, 2021, now Pat. No. 11,648,859, which is a continuation of application No. 16/432,265, filed on Jun. 5, 2019, now Pat. No. 10,899,255, which is a continuation of application No. 15/312,423, filed as application No. PCT/JP2015/064259 on May 19, 2015, now Pat. No. 10,315,543.

(51) Int. Cl.
 *B60N 2/64* (2006.01)
 *B60N 2/66* (2006.01)
 *B60N 2/80* (2018.01)

(52) U.S. Cl.
 CPC ............... *B60N 2/914* (2018.02); *B60N 2/99* (2018.02); *B60N 2/995* (2018.02)

(56) References Cited

U.S. PATENT DOCUMENTS

| | | | |
|---|---|---|---|
| 6,088,642 A | 7/2000 | Finkelstein et al. | |
| 6,088,643 A | 7/2000 | Long et al. | |
| 6,203,105 B1 | 3/2001 | Rhodes | |
| 6,283,547 B1 | 9/2001 | Bauer et al. | |
| 7,237,443 B2 | 7/2007 | Speckhart et al. | |
| 7,708,343 B2 | 5/2010 | Kayumi et al. | |
| 7,727,171 B2 * | 6/2010 | Ozaki | B60N 2/976 601/149 |
| 8,162,398 B2 | 4/2012 | Colja et al. | |
| 8,342,607 B2 | 1/2013 | Hofmann et al. | |
| 10,315,543 B2 * | 6/2019 | Mizoi | B60N 2/914 |
| 10,315,547 B2 | 6/2019 | Shibata et al. | |
| 10,899,255 B2 * | 1/2021 | Mizoi | B60N 2/99 |
| 11,648,859 B2 * | 5/2023 | Mizoi | B60N 2/99 297/284.1 |
| 11,945,350 B2 * | 4/2024 | Mizoi | B60N 2/0284 |
| 2008/0191532 A1 | 8/2008 | Wain | |
| 2014/0167460 A1 | 6/2014 | Prexl et al. | |
| 2015/0321590 A1 | 11/2015 | Mizoi et al. | |
| 2018/0326881 A1 | 11/2018 | Patrick et al. | |

FOREIGN PATENT DOCUMENTS

| | | |
|---|---|---|
| JP | 2664599 B2 | 10/1997 |
| JP | 2001-112565 A | 4/2001 |
| JP | 2010-115474 A | 5/2010 |

* cited by examiner

WIDTH DIRECTION

VEHICLE SEAT

CROSS REFERENCE TO RELATED APPLICATIONS

This application is a continuation of U.S. patent application Ser. No. 18/316,268, filed May 12, 2023, which is a continuation of U.S. patent application Ser. No. 17/156,829, filed Jan. 25, 2021, now U.S. Pat. No. 11,648,859, which is a continuation of U.S. patent application Ser. No. 16/432,265, filed Jun. 5, 2019, now U.S. Pat. No. 10,899,255, which is a continuation of U.S. patent application Ser. No. 15/312,423, filed Nov. 18, 2016, now U.S. Pat. No. 10,315,543, which is a National Stage Entry application of PCT Application No. PCT/JP2015/064259, filed May 19, 2015, which claims the priority benefit of Japanese Patent Application No. JP2014-103593, filed May 19, 2014, the contents of all being incorporated herein by reference.

BACKGROUND

The present disclosure relates to a vehicle seat, and particularly relates to a vehicle seat including an expandable bag body at shoulder support portions configured to support a corresponding one of the shoulders of a seated passenger, each shoulder support portion being provided at a seat back configured to support the seated passenger from a back side.

Among vehicle seats, there is a vehicle seat including, in a seat back, an expandable/contractible bag body such as an air cell for the purpose of, e.g., adjustment of a seating posture of a seated passenger. According to the seat with such a configuration, a seating surface shape is changed by expansion/contraction of the bag body so that the seating posture can be adjusted. Examples of the seat including the expandable/contractible bag body include a seat described in Japanese Patent No. 2664599.

In the seat described in Japanese Patent No. 2664599, each of an upper bag portion and a lower bag portion in a seat back includes an air mat as a bag body, and a support panel at a front position of the air mat. By expansion of the air mat, the support panel tilts forward to push the back of a seated passenger forward, and in this manner, a seating posture of the seated passenger is adjusted. Particularly in the upper bag portion, when the support panel tilts forward by expansion of the air mat, the shoulders of the back of the seated passenger are pushed forward.

Note that the examples of the seat including the expandable/contractible bag body include seats other than the vehicle seat, and as an example, there is a relaxing chair described in Japanese Patent Publication JP 2001-112565. In a bag body provided in this relaxing chair, any of liquid, fluid, a mixture of liquid and grains, and solid containing flexibility is housed as a medium. When a user is seated on the relaxing seat and leans on a back portion of the relaxing seat, the above-described bag body comes into close contact with the back of the seated user. As a result, a favorable feeling of fitting can be provided to the seated user of the relaxing chair.

In order to properly adjust the seating posture of the seated passenger and properly provide the favorable feeling of fitting, the bag body provided in the seat needs to properly expand/contract at an arrangement position of the bag body. For proper expansion/contraction, a direction in expansion of the bag body needs to be stabilized. In order to stabilize such a direction, a fixed state of the bag body needs to be stabilized. Particularly in proper adjustment of the degree of pushing (pressing force) of the bag body pushing the vicinity of a corresponding one of the shoulders of the passenger seated on the seat, the fixed state of the bag body needs to be further stabilized. On the other hand, Japanese Patent No. 2664599 and Japanese Patent Publication JP 2001-112565 describe the arrangement position of the bag body, but do not mention the way to fix the bag body. That is, a specific configuration for stabilizing the fixed state of the bag body is not clearly described in Japanese Patent No. 2664599 and Japanese Patent Publication JP 2001-112565.

In addition to the above-described demand for stabilizing the fixed state of the bag body pushing the vicinity of a corresponding one of the shoulders of the seated passenger, it has been demanded that such a bag body is fixed at a proper position to properly push a corresponding one of the shoulders of the seated passenger. Further, in the configuration in which the shoulders of the seated passenger are pushed through the plate-shaped member disposed at the front position of the bag body as described in Japanese Patent No. 2664599, the plate-shaped member needs to be supported so that the plate-shaped member can fulfill functions thereof.

SUMMARY

The present disclosure has been made in view of the above-described problems, and an embodiment of the present disclosure provides a vehicle seat that stabilizes a fixed state of each bag body configured to expand to push a corresponding one of the shoulders of a seated passenger. An embodiment of the present disclosure also fixes each bag body at such a position that a corresponding one of the shoulders of the seated passenger can be properly pressed. An embodiment of the present disclosure properly supports a plate-shaped member disposed at a front position of each bag body in the configuration in which the shoulders of the seated passenger are pushed through the plate-shaped member.

The above-described problems are solved by an embodiment of a vehicle seat of the present disclosure. An embodiment of the vehicle seat of the present disclosure is a vehicle seat including a seat back configured to support a seated passenger from a back side of the seated passenger. A shoulder support portion provided at the seat back and configured to support each shoulder of the seated passenger includes a bag body configured to expand by injection of fluid. The bag body includes fixing target portions at respective end portions of the bag body in the extending direction thereof, and is attached to the inside of the seat back in such a manner that each of the fixing target portions is fixed to a corresponding one of fixing positions separated from each other in the width direction of the vehicle seat.

According to the above-described vehicle seat, the bag body is fixed at both end portions of the bag body in the extending direction thereof, and therefore, a fixed state of the bag body is stabilized. Moreover, the positions (e.g., the fixing positions) at which the bag body is fixed are positions different from each other in the width direction of the vehicle seat, i.e., the direction along a shoulder width of the seated passenger. With this configuration, when the bag body is fixed along the shoulder width of the seated passenger, the fixed state of the bag body is further stabilized.

In an embodiment of the above-described vehicle seat, the fixing target portions are preferably provided in a lower region at the end portions of the bag body in the extending direction thereof. According to the above-described configuration, an upper region of the bag body is not fixed, and therefore, the upper region easily moves forward in expansion of the bag body. With this configuration, the bag body configured to expand to push a corresponding one of the shoulders of the seated passenger expands in such a direction that the shoulders of the seated passenger are properly pressed.

In an embodiment of the above-described vehicle seat, the fixing position for the fixing target portion of the fixing target portions provided at respective end portions of the bag body in the extending direction thereof located in the inner side in the width direction is more preferably a position deviating, in both of a height direction and a width direction of the vehicle seat, from a region corresponding to the shoulder blades of the seated passenger on the vehicle seat. In the above-described configuration, when the passenger is seated on the vehicle seat, the fixing position which is included in the fixing positions for the fixing target portions provided at respective end portions of the bag body in the extending direction thereof and which is for the fixing target portion on the inner side in the width direction is the position apart from the shoulder blades of the seated passenger. With this configuration, a feeling of discomfort of the seated passenger when the above-described fixing positions are at positions (simply, back positions of the shoulder blades) overlapping with the shoulder blades in a front-to-back direction can be reduced.

In an embodiment of the above-described vehicle seat, an arrangement position of the bag body is much more preferably a position deviating, in the width direction, from a region corresponding to the backbone of the seated passenger on the vehicle seat. In the above-described configuration, the arrangement position of the bag body is the position apart from the backbone of the passenger seated on the vehicle seat. With this configuration, the horizontal width (the length in the width direction of the vehicle seat) of the bag body is more shortened as compared to the configuration in which the arrangement position of the bag body reaches the region corresponding to the backbone in the width direction of the vehicle seat, and the size of the bag body can be reduced.

In an embodiment of the above-described vehicle seat, the fixing position for the fixing target portion of the fixing target portions provided at respective end portions of the bag body in the extending direction thereof located in the outer side in the width direction is more preferably a position deviating, in both of the height direction and the width direction of the vehicle seat, from a region corresponding to the trapezius of the seated passenger on the vehicle seat. In the above-described configuration, when the passenger is seated on the vehicle seat, the fixing position which is included in the fixing positions for the fixing target portions provided in the respective end portions of the bag body in the extending direction thereof and which is for the fixing target portion on the outer side in the width direction is the position apart from the trapezius of the seated passenger. With this configuration, a feeling of discomfort of the seated passenger when the above-described fixing positions are at positions (simply, back positions of the trapezius) overlapping with the trapezius in the front-to-back direction can be reduced.

In an embodiment of the above-described vehicle seat, the seat back much more preferably includes a seat back frame forming a framework of the seat back, and a plate-shaped fixing member disposed between one end portion and the other end portion of the seat back frame in the width direction, and the fixing positions are much more preferably on a front surface of the fixing member. According to the above-described configuration, the bag body is attached to the front surface of the fixing member, and therefore, can be favorably supported. Moreover, the bag body is, in expansion, controlled by the fixing member to expand forward, and therefore, can expand to properly push a corresponding one of the shoulders of the seated passenger.

In an embodiment of the above-described vehicle seat, the fixing position for the fixing target portion of the fixing target portions provided at respective end portions of the bag body in the extending direction thereof located in a lower side is much more preferably in a lower region of the front surface. In the above-described configuration, the fixing position which is included in the fixing positions for the fixing target portions provided in the respective end portions of the bag body in the extending direction thereof and which is for the fixing target portion on the lower side is in the lower region of the front surface of the fixing member. With this configuration, the height (the length in an upper-to-lower direction) of the fixing member is more shortened as compared to the case where the above-described fixing positions are in a center region of the front surface of the fixing member, and an increase in the size of the fixing member can be suppressed.

In an embodiment of the above-described vehicle seat, the seat back more preferably includes a plate-shaped member disposed at a front position of the bag body. The plate-shaped member more preferably includes a deformable portion having a back surface contacting the bag body and configured to deform by expansion of the bag body contacting the back surface, and an extension positioned lower than the deformable portion and extending downward. The plate-shaped member is more preferably supported by a support body provided in the seat back. A portion of the plate-shaped member supported by the support body is more preferably provided between the deformable portion and the extension. In the above-described configuration, the plate-shaped member disposed at the front position of the bag body includes the deformable portion configured to change in association with expansion of the bag body, and the extension extending downward. The plate-shaped member is supported by the support body at the point positioned between the deformable portion and the extension. With this configuration, the plate-shaped member can be supported without difficulty in deformation of the deformable portion. That is, in the above-described configuration, the plate-shaped member can be properly supported while the deformable portion can favorably deform.

In an embodiment of the above-described vehicle seat, the position of the portion of the plate-shaped member supported by the support body is preferably a position reaching, in both of the height direction and the width direction of the vehicle seat, a region corresponding to the ninth cervical spine of the seated passenger on the vehicle seat. In the above-described configuration, the position of the portion of the plate-shaped member supported by the support body is the position reaching the region corresponding to the ninth cervical spine of the seated passenger. At the position of the ninth cervical spine, a displacement when a seating posture of the seated passenger changes is relatively small. Thus, as long as a support position of the plate-shaped member reaches the region corresponding to the ninth cervical spine, a support state of the plate-shaped member can be stabilized.

In an embodiment of the above-described vehicle seat, the seat back more preferably includes the seat back frame forming the framework of the seat back, and the plate-shaped fixing member disposed between one end portion and the other end portion of the seat back frame in the width direction. The fixing positions are more preferably on the front surface of the fixing member. The position of the portion of the plate-shaped member supported by the support body and the fixing positions on the front surface are more preferably positions different from each other in the width direction. In the above-described configuration, the position of the portion of the plate-shaped member supported by the support body and the fixing positions of the bag body provided on the front surface of the fixing member are the positions different from each other in the width direction of the vehicle seat. With such a position relationship, contact between the portion of the plate-shaped member supported by the support body and the bag body can be reduced.

According to an embodiment of the present disclosure, the bag body is fixed at such a position that a corresponding one of the shoulders of the seated passenger can be properly pushed, and the fixed state of the bag body is further stabilized. Moreover, according to an embodiment of the present disclosure, the bag body configured to expand to push a corresponding one of the shoulders of the seated passenger expands in such a direction that such a shoulder of the seated passenger is properly pressed. Further, according to an embodiment of the present disclosure, the feeling of discomfort of the seated passenger when the fixing position which is included in the fixing positions for the fixing target portions provided at the bag body and which is for the fixing target portion on the inner side in the width direction overlaps with the shoulder blades in the front-to-back direction can be reduced. In addition, according to an embodiment of the present disclosure, the size of the bag body can be more reduced as compared to the configuration in which the arrangement position of the bag body reaches the region corresponding to the backbone in the width direction of the vehicle seat. Moreover, according to an embodiment of the present disclosure, the feeling of discomfort of the seated passenger when the fixing position which is included in the fixing positions for the fixing target portions provided at the bag body and which is for the fixing target portion on the outer side in the width direction overlaps with the trapezius in the front-to-back direction can be reduced. Further, according to an embodiment of the present disclosure, the bag body is favorably supported on the front surface of the fixing member. In expansion, the bag body is controlled by the fixing member to expand forward, thereby properly pushing a corresponding one of the shoulders of the seated passenger. In addition, according to an embodiment of the present disclosure, an increase in the size of the fixing member can be suppressed. Moreover, according to an embodiment of the present disclosure, the plate-shaped member can be properly supported while the deformable portion of the plate-shaped member can favorably deform. Further, according to an embodiment of the present disclosure, the support state of the plate-shaped member is stabilized. In addition, according to an embodiment of the present disclosure, contact between the portion of the plate-shaped member supported by the support body and the bag body can be reduced.

BRIEF DESCRIPTION OF DRAWINGS

Various embodiments of the invention are illustrated in the drawings, in which.

DETAILED DESCRIPTION

An embodiment of a vehicle seat (referred to herein as the present embodiment) of the present disclosure is described below with reference to the drawings. Note that in the description below, a "front-to-back direction" is the front-to-back direction of the vehicle seat, and is coincident with a traveling direction when a vehicle is traveling. Moreover, a "width direction" is the width direction of the vehicle seat, and is a right-to-left direction when the vehicle seat is viewed from the front side thereof. Further, a "height direction" is the height direction of the vehicle seat, and is coincident with the vertical direction when the vehicle is traveling on the horizontal plane.

The embodiments described below are set forth merely as examples for the sake of easy understanding of the invention, and does not limit the invention. That is, changes and modifications can be made to the embodiments of the present disclosure without departing from the gist of the invention, and thus the invention includes equivalents thereof. In particular, the shape, material, arrangement position, etc. of various components described below can be, as desired, changed without departing from the gist of the invention.

In the description below, an adult male with standard proportions is assumed as a seated passenger, and when, for example, a position relationship with each body portion of the seated passenger is mentioned to describe the structure of each portion of the vehicle seat, the body of the adult male with the standard proportions is similarly used as a reference. The "standard proportions" described herein are optionally set according to, e.g., location and time of utilization of the vehicle seat of the present embodiment and regulations to be applied. In the present embodiment, average proportions covering 95% of adult males (in particular, American adult males) are set as the standard proportions.

Outline Configuration of Vehicle Seat of the Present Embodiment

An outline configuration of the vehicle seat (hereinafter referred to as a "present seat S") of the present embodiment is now described. A large portion of a basic configuration of the present seat S is common to that of a typical vehicle seat, except for shoulder supports A1, side supports A2, a lumbar support A3, and an ottoman portion A4 as described below.

Figure 1:
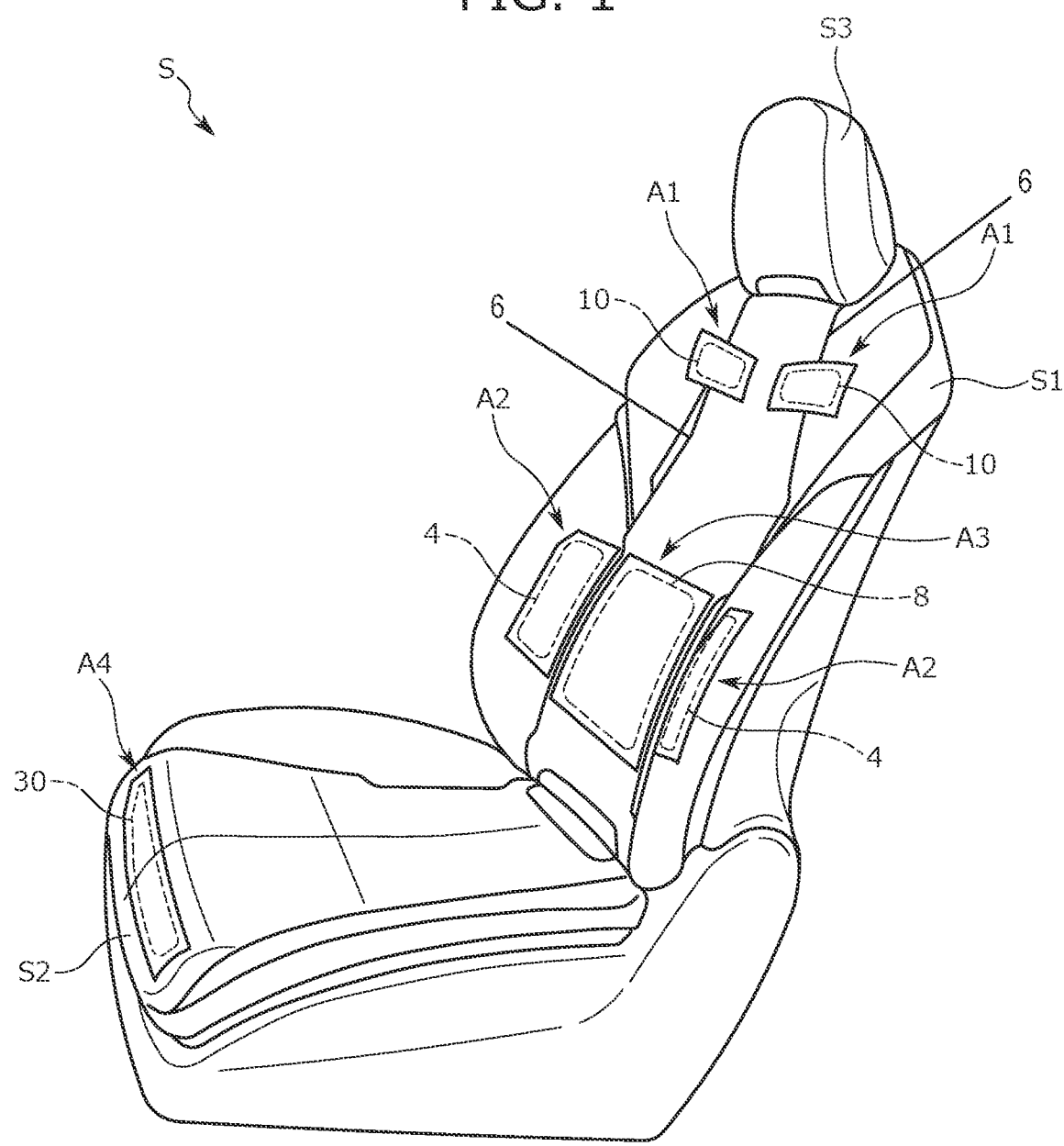
FIG. 1 is a perspective schematic view of an example configuration of a vehicle seat, according to an embodiment of the present disclosure.

As illustrated in FIG. 1, the present seat S includes a seat back S1 configured to support the seated passenger from the back side, a seat cushion S2 configured to support the hip of the seated passenger, and a head rest S3 configured to support the head of the seated passenger. The seat back S1 and the seat cushion S2 are each configured such that a pad material placed on a frame body is covered with a cover material. The head rest S3 is configured such that a pad material placed on a core of a head portion is covered with a cover material. Moreover, the head rest S3 is supported at an upper end portion of the seat back S1 through head rest pillars hp illustrated in FIG. 2.

The present seat S further includes equipment (e.g., sensors) configured to measure a seating posture of the seated passenger, and a mechanism configured to adjust (e.g., correct) the seating posture. On at least this point, the present seat S is different from the typical vehicle seat. The configuration for seating posture adjustment in the present seat S is described below.

Configuration for Seating Posture Adjustment

The seating posture adjustment mechanism provided at the present seat S includes the shoulder supports A1, the side supports A2, the lumbar support A3, and the ottoman portion A4. In description of these components, the shoulder supports A1 are equivalent to shoulder support portions, and are provided respectively at positions supporting the shoulders of the seated passenger from the back side in the seat back S1 as illustrated in FIG. 1. Note that in the present embodiment, the shoulder supports A1 are provided in a pair at positions separated from each other in the width direction.

The side supports A2 are equivalent to lateral support portions. As illustrated in FIG. 1, the side supports A2 are provided at respective end portions of the seat back S1 in the width direction, and laterally support the trunk of the body of the seated passenger. The lumbar support A3 is equivalent to a waist support portion. As illustrated in FIG. 1, the lumbar support A3 is provided at a position supporting the waist (in particular, a portion extending from the stomach to the waist) of the seated passenger from the back side in the seat back S1. The ottoman portion A4 is equivalent to a knee support portion. As illustrated in FIG. 1, the ottoman portion A4 is attached to a front end of the seat cushion S2 to support the knees of the legs of the seated passenger from the knee back side.

In description of an example basic configuration of the above-described support portions, each support portion has an air cell. The air cell is a bag body configured to freely expand/contract by inflow/outflow with air as an example of fluid. Each support portion pushes a corresponding portion of the body of the seated passenger by expansion of the air cell.

Figure 2:
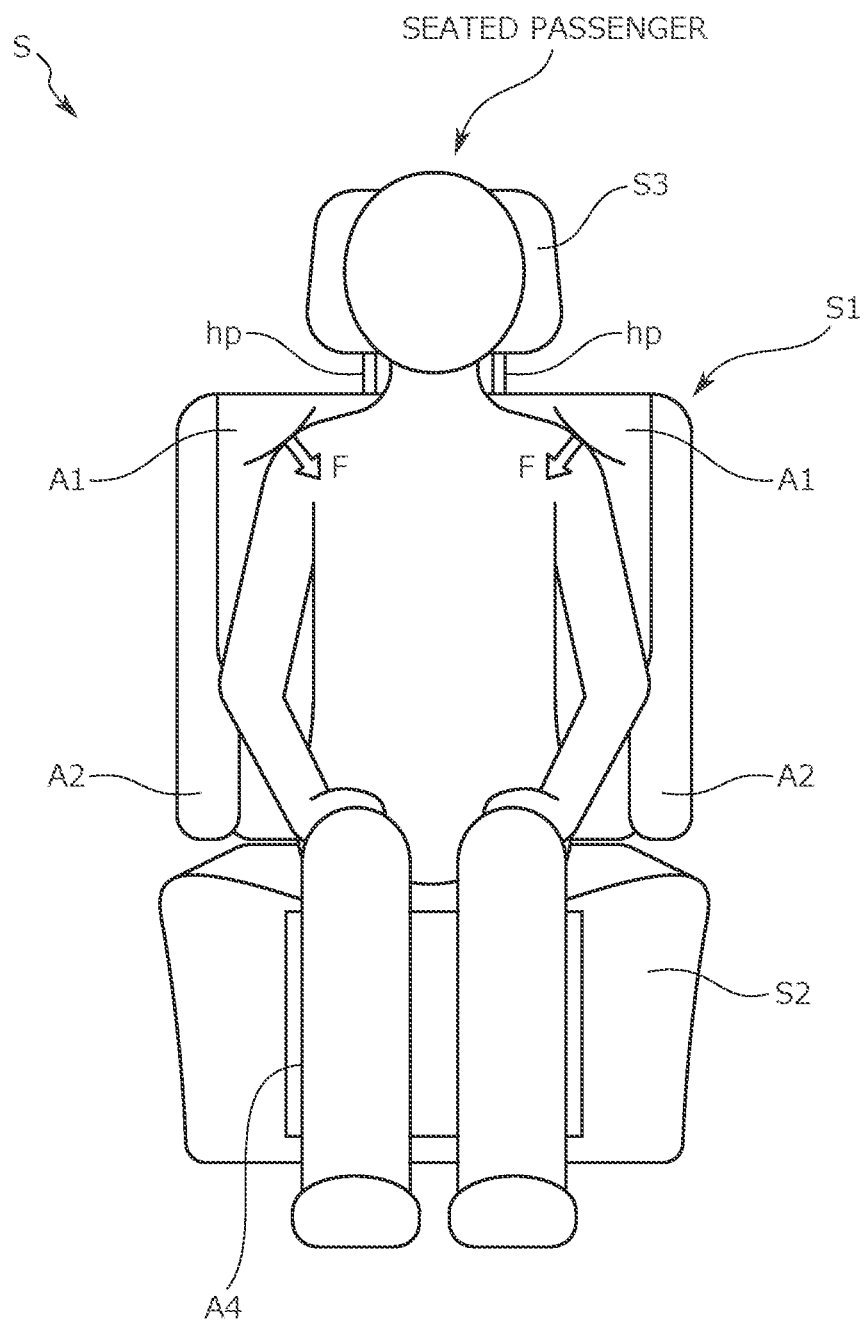
FIG. 2 is a front schematic view of an example state in which portions of the vehicle seat of FIG. 1 support corresponding portions of a seated passenger body, according to an embodiment.

Specifically, an air cell 10 is built in each shoulder support A1, and expands to push a corresponding one of the shoulders of the seated passenger from the back side. More specifically, expansion of the air cell 10 allows the shoulder support A1 to contact a corresponding one of the shoulders of the seated passenger, and therefore, provides a pressing force to such a shoulder of the seated passenger as indicated by a character F in FIG. 2. The pressing force F contains, as illustrated in FIG. 2, an inward component in the width direction and a downward component in the width direction. That is, the shoulder supports A1 push to wrap around the shoulders of the seated passenger. Such a function of the shoulder supports A1 can reduce displacement of the upper body of the seated passenger in the width direction and an upper-to-lower direction, and therefore, the seating posture during a seating period can be stably held.

For the purpose of more efficiently pushing the shoulders of the seated passenger, the shoulder supports A1 include a resin plate at the front position of the air cells 10. Although such a plate is described in detail below, each air cell 10 expands to contact a back surface of the plate, and therefore, each shoulder support A1 pushes a corresponding one of the shoulders of the seated passenger at a front surface of the plate.

A lateral air cell 4 is built in each side support A2, and expands to laterally push the trunk of the body of the seated passenger inward in the width direction. For the purpose of more efficiently pushing the trunk of the body of the seated passenger, the side supports A2 include the resin plate at the side position (the inner side position in the width direction) of each lateral air cell 4. Such a plate is made of a material similar to that of the plate of the shoulder supports A1, and each lateral air cell 4 expands to contact the back surface (an outer surface in the width direction) of the plate. Thus, the side supports A2 push the trunk of the body of the seated passenger at the front surface (an inner surface in the width direction) of the plate.

A waist air cell 8 is built in the lumbar support A3, and expands to push the waist of the seated passenger from the back side. For the purpose of more efficiently pushing the waist of the seated passenger, the lumbar support A3 includes the resin plate at the front position of the waist air cell 8. Such a plate is made of a material similar to that of the plate of the shoulder supports A1, and the waist air cell 8 expands to contact the back surface of the plate. Thus, the lumbar support A3 pushes the waist of the seated passenger at the front surface of the plate.

The ottoman portion A4 includes an air cell (an ottoman air cell 30) disposed at the front end of the seat cushion S2, and the ottoman air cell 30 expands to push up the knees of the legs of the seated passenger. For the purpose of efficiently pushing up the knees of the legs of the seated passenger, the ottoman portion A4 includes a band-shaped member at the front position of the ottoman air cell 30. Such a band-shaped member is normally in a suspending state, and when the ottoman air cell 30 expands to contact a back surface of the band-shaped member, the band-shaped member is lifted up accordingly. Thus, the ottoman portion A4 supports the knees of the legs of the seated passenger at a front surface (an upper surface) of the lifted band-shaped member. Note that the band-shaped member is described in detail below.

Figure 3:
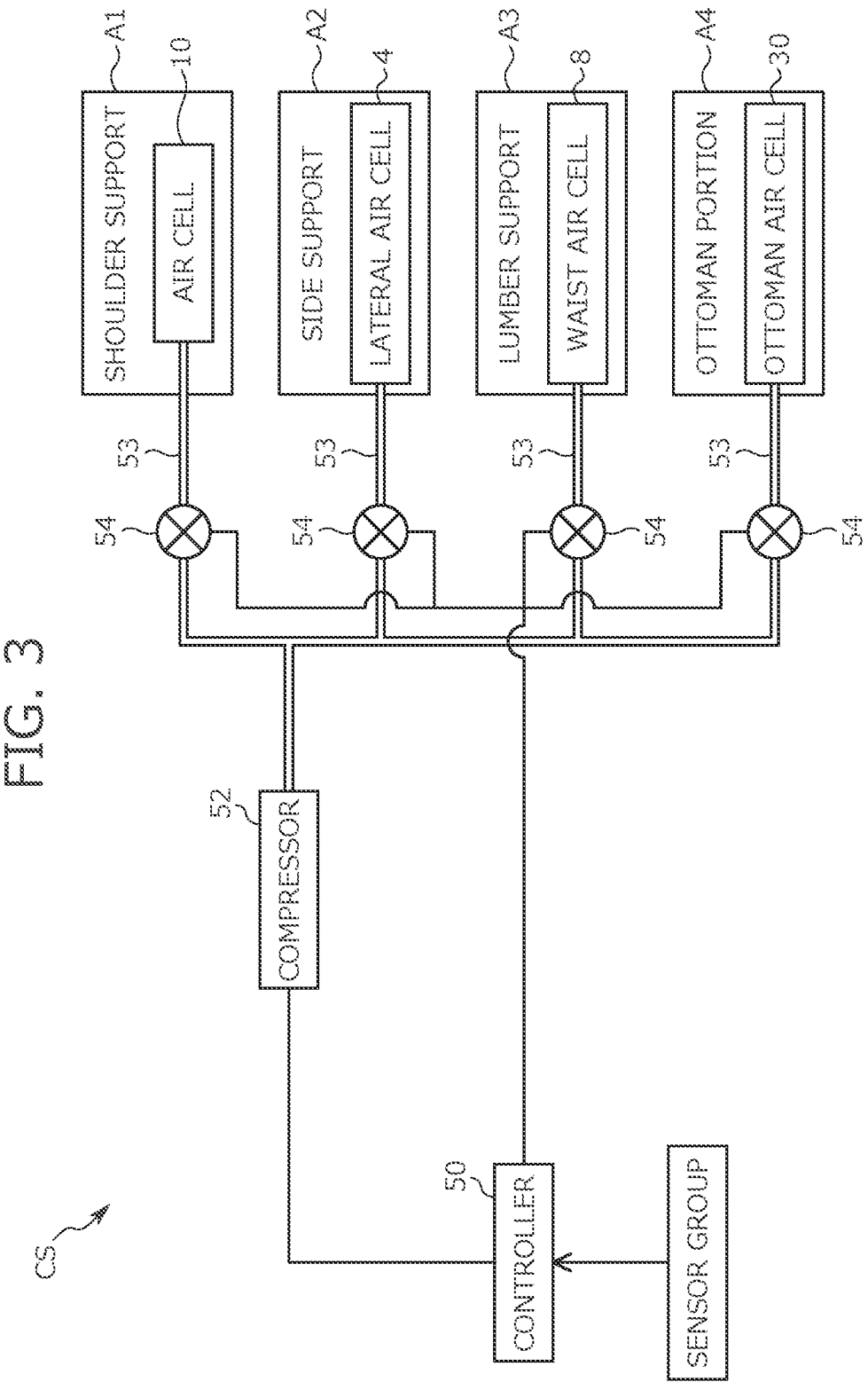
FIG. 3 is a block diagram of an example system configuration for executing correction control of a seating posture, according to an embodiment.

Expansion and contraction of the air cell (the air cells 10, the lateral air cells 4, the waist air cell 8, and the ottoman air cell 30) provided at each support portion are controlled by a control system CS formed in the vehicle equipped with the present seat S. As illustrated in FIG. 3, the control system CS includes a sensor group for measuring the seating posture of the seated passenger, a controller 50, a compressor 52, and an air supply passage 53 connected to the compressor 52. The air supply passage 53 is branched and connected to each air cell, and an electromagnetic valve 54 is provided at a halfway position of each branched air supply passage 53.

The sensor group includes a shape sensor, a body pressure sensor, a weight sensor, etc. mounted on the present seat S. This sensor group measures index values for the seating posture, the index values including, for example, a skeleton curving state, pressure distribution in the vicinity of the shoulders, pressure distribution in each portion of the back, pressure distribution in the vicinity of the waist, pressure distribution in an area extending from the hip to each knee back, and a body weight.

Figure 10:
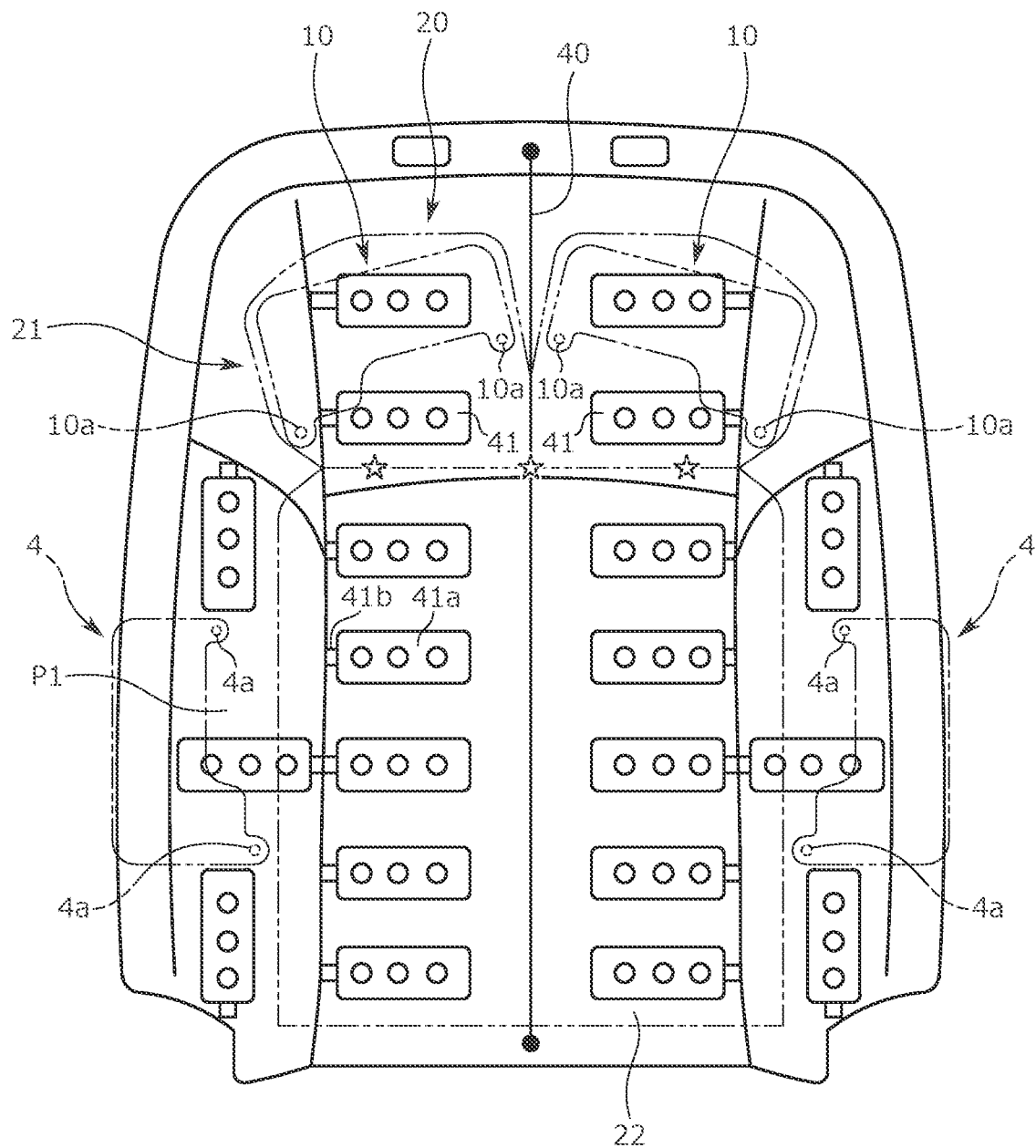
FIG. 10 is a front schematic view of an example arrangement positions of sensors, according to an embodiment.

A shape sensor 40 and body pressure sensors 41 as illustrated in FIG. 10 is referred to herein as the sensors of the sensor group provided in the seat back S1. The shape sensor 40 is formed of a shape sensing optical fiber having flexibility, and is configured to bend along a skeleton curving shape of the seated passenger to detect the posture of the seated passenger and output a signal corresponding to a detection result. Moreover, as illustrated in FIG. 10, the shape sensor 40 is disposed at a center portion of the seat back S1 in the width direction to properly bend along the skeleton (e.g., the spine) of the seated passenger.

Each body pressure sensor 41 is formed in a substantially strip film shape, and includes a detector 41a as a sensor body and a transmission path 41b for a signal output from the detector 41a. Each body pressure sensor 41 is interposed between a pad material PI and the cover material which form the seat back S1. The body pressure sensors 41 are arranged respectively at body pressure distribution measurable positions in the vicinity of the shoulders, the entirety of the back, and the vicinity of the waist of the seated passenger. More specifically, each body pressure sensor 41 is disposed at a position apart from the shape sensor 40 in the width direction. Specifically, as illustrated in FIG. 10, the plurality of body pressure sensors 41 are provided in a landscape orientation at the side positions of the shape sensor 40, and are arranged in the upper-to-lower direction.

The controller 50 includes an electronic control unit (ECU) mounted on the vehicle, and is configured to drive each support portion based on the measurement result of each sensor of the sensor group. In an embodiment, after a proper control amount has been set from the measurement results of various sensors, the controller 50 starts the compressor 52 to open each electromagnetic valve 54. Thus, the volume of air corresponding to the set control amount is injected into each air cell. As a result, each support portion is driven by a drive amount corresponding to the above-described control amount.

Then, each support portion (specifically, the shoulder supports A1, the side supports A2, and the lumbar support A3) is driven to press a corresponding portion of the body of the seated passenger. With this configuration, the posture (the seating posture) of the passenger seated on the present seat S is corrected, and then, the seated passenger is held in the corrected posture during the seating period.

Note that in the present embodiment, air is injected into each air cell to drive a corresponding one of the support portions, and in this manner, such an air cell expands. However, types of fluid other than air may be injected into a bag body other than the air cell, and in this manner, such a bag body may expand.

Internal Configuration of Seat Back

Figure 4:
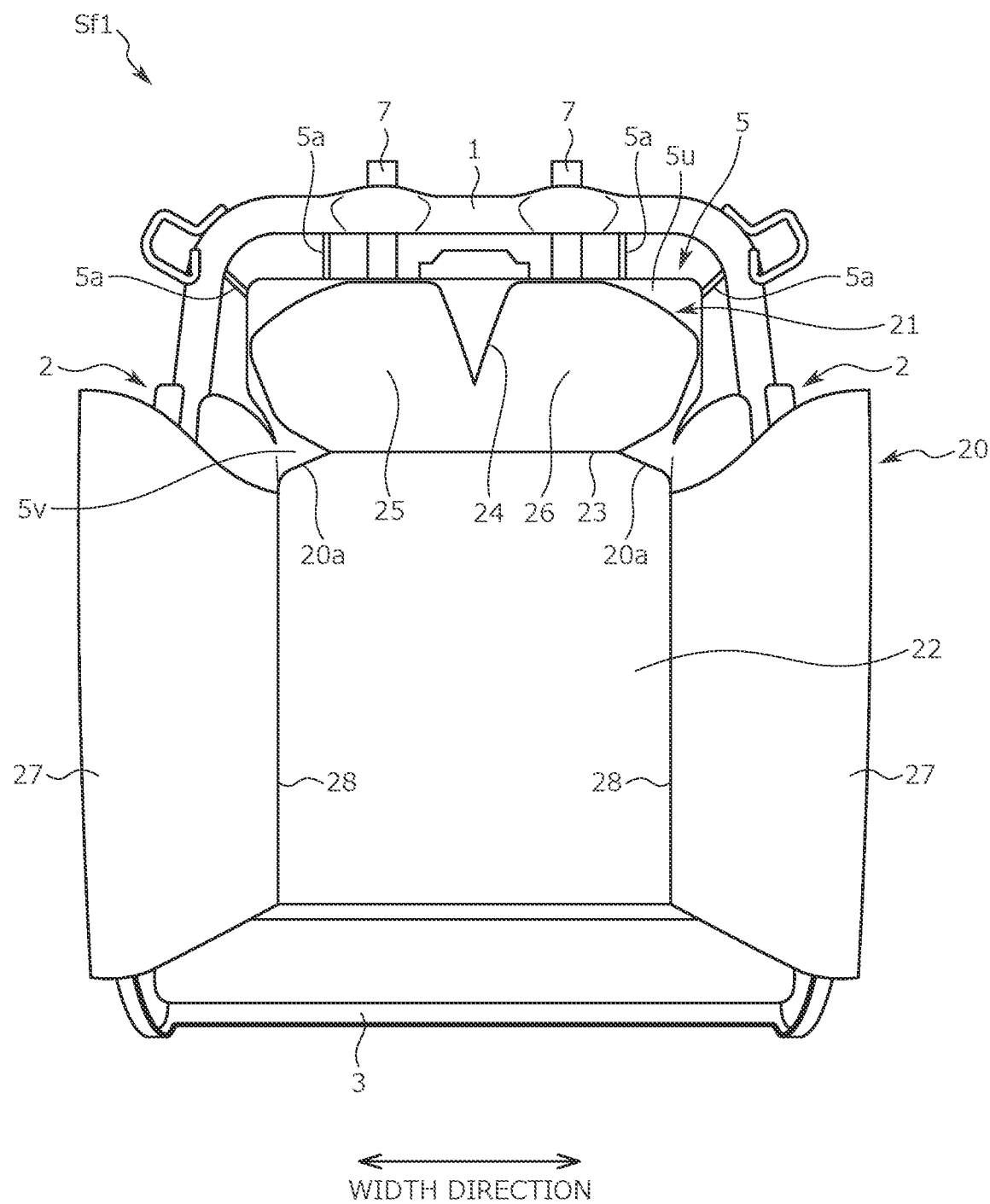
FIG. 4 is a front schematic view of an example seat back frame configuration of an embodiment of the present disclosure.

Next, an internal structure of the seat back S1 of the present seat S is described with reference to FIGS. 4 and 5. FIG. 4 is a view of a seat back frame Sf1 from the front side, and FIG. 5 is a view in the state in which a resin plate 20 (described below) is detached from the seat back frame Sf1 illustrated in FIG. 4.

Figure 5:
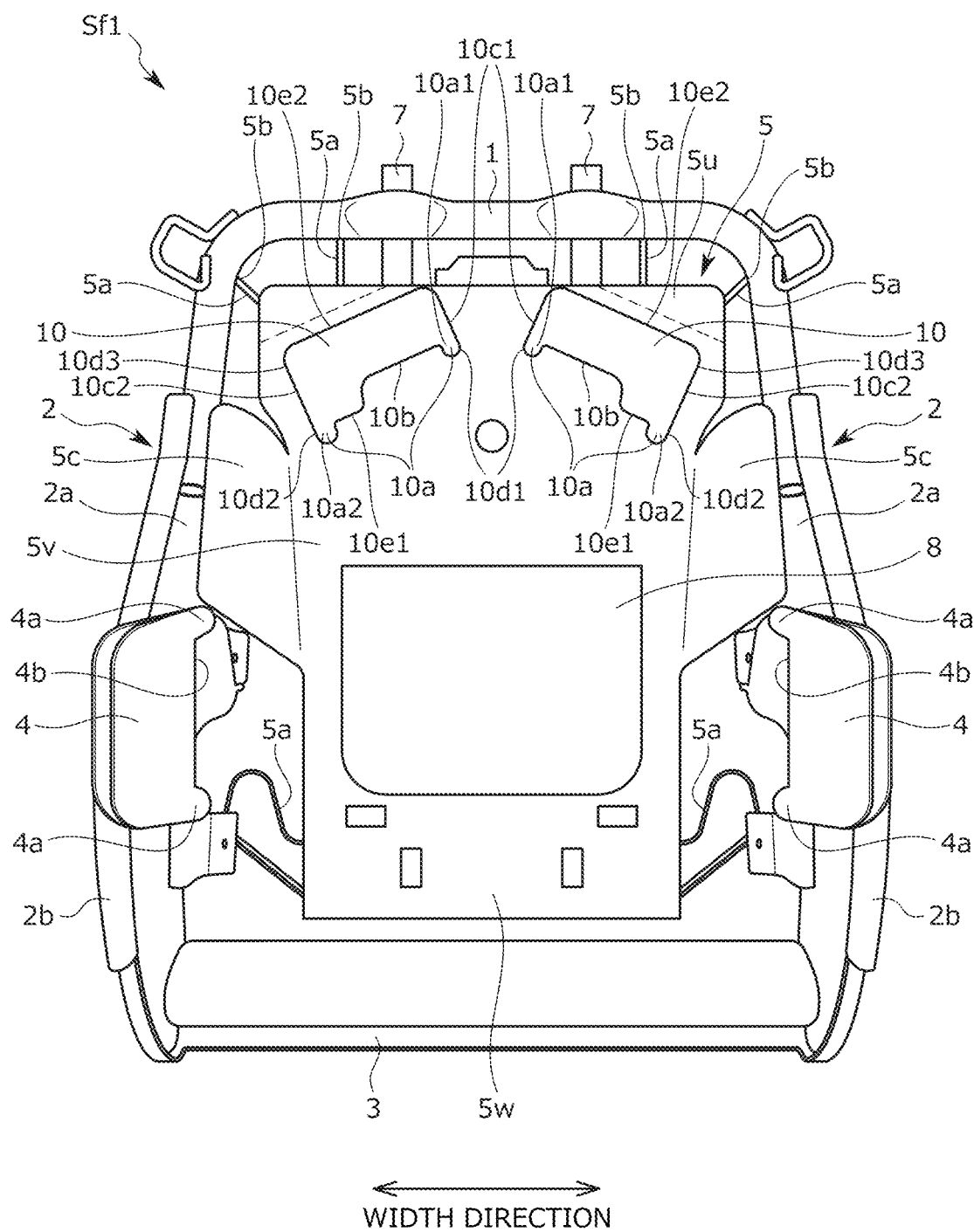
FIG. 5 is a front schematic view of an example state in which a plate-shaped member is detached from a seat back frame of the embodiment of the present disclosure.

As illustrated in FIGS. 4 and 5, the seat back frame Sf1 forming a framework of the seat back S1 is provided in the seat back S1. The seat back frame Sf1 is a substantially rectangular frame body as viewed from the front side, and includes an upper frame 1, a pair of lateral frames 2, and a lower coupling frame 3.

The upper frame 1 is a portion coupling upper ends of the pair of lateral frames 2, and is configured such that a metal pipe is processed to bend in an inverted U-shape. Of the upper frame 1, a portion extending along the width direction forms an upper end portion of the seat back frame Sf1. A predetermined region (e.g., a region positioned slightly on the outer side with respect to the center in the width direction) of such a portion is attached to tubular pillar support portions 7. Each head rest pillar hp extending from a lower portion of the head rest S3 is inserted into a corresponding one of the pillar support portions 7, and therefore, the head rest S3 is positioned above the upper frame 1.

The pair of lateral frames 2 are arranged separated from each other in the width direction at the seat back frame Sf1, and extend in the height direction. The pair of lateral frames 2 and downwardly-extending portions of the upper frame 1 together form respective end portions of the seat back frame Sf1 in the width direction. As illustrated in FIG. 5, each lateral frame 2 includes a flat plate-shaped lateral plate 2a, and a front edge portion 2b bending inward in a U-shape from a front end portion of the lateral plate 2a. Of each lateral plate 2a, an inner surface in the width direction is attached to a corresponding one of the lateral air cells 4 forming the side supports A2.

The lower coupling frame 3 forms a lower end portion of the seat back frame Sf1, and couples lower end portions of the lateral frames 2.

In further description of the internal structure of the seat back S1, a space is, as illustrated in FIG. 5, formed between one end portion and the other end portion of the seat back frame Sf1 in the width direction. In the above-described space, a pressure receiving plate 5 formed as a plate-shaped member is disposed. The pressure receiving plate 5 is a resin member configured to receive pressure when the back of the seated passenger leans on the seat back S1, and is formed in a generally vertically-elongated rectangular shape as viewed from the front side. Note that the shape of the pressure receiving plate 5 is not limited to the shape illustrated in FIG. 5, and may be other shapes, in other embodiments.

In description of the configuration of the pressure receiving plate 5 with reference to FIG. 5, the pressure receiving plate 5 includes an upper portion 5u positioned on the uppermost side, a center portion 5v wider than the upper portion 5u, and a lower portion 5w extending downward. In the present embodiment, the upper portion 5u, the center portion 5v, and the lower portion 5w are integrally formed to form the single pressure receiving plate 5.

The upper portion 5*u* is positioned on the inner side of the upper frame 1, and is positioned at the back of the shoulders of the seated passenger when the passenger is seated on the present seat S. The air cells 10 forming the shoulder supports A1 are fixed to a front surface of the upper portion 5*u*. That is, in the present seat S, the pressure receiving plate 5 has original functions thereof, as well as having a function as the member for fixing the air cells 10, i.e., a fixing member. Since the pressure receiving plate 5 is utilized as the member for fixing the air cells 10 as described above, the number of components is reduced as compared to the case of separately providing the fixing member, and the configuration of the seat back frame Sf1 can be further simplified.

In the present embodiment, there are two shoulder supports A1, and the air cells 10 are provided respectively for the shoulder supports A1. That is, in the present embodiment, the two air cells 10 are fixed to the upper portion 5*u* as the fixing member. More specifically, the two air cells 10 are, as illustrated in FIG. 5, arranged symmetrically with respect to the center of the seat back S1 in the width direction, and are each disposed in such an inclined orientation that the air cell 10 is positioned lower toward the outer side in the width direction.

Note that in the present embodiment, the upper portion 5*u* is in the horizontally-elongated rectangular shape as viewed from the front side, but the present disclosure is not limited to such a shape. As indicated by dashed lines in FIG. 5, the upper portion 5*u* may be in the following shape: upper corners of the upper portion 5*u* are chamfered such that an outer edge (e.g., a portion of the outer edge positioned on the upper side) of the upper portion 5*u* is along the air cell 10 in the inclined orientation.

The center portion 5*v* is disposed at a position sandwiched between the lateral frames 2. Moreover, the center portion 5*v* is configured such that each end portion of the center portion 5*v* in the width direction slightly bends forward with respect to a center portion of the center portion 5*v* in the width direction.

The lower portion 5*w* is slightly narrower than the upper portion 5*u*, and a lower end of the lower portion 5*w* extends downward to reach the vicinity of the lower coupling frame 3. As illustrated in FIG. 5, the waist air cell 8 forming the lumbar support A3 is disposed at a position extending over the center portion 5*v* and the lower portion 5*w* on a front surface of the pressure receiving plate 5. That is, the pressure receiving plate 5 is the fixing member for fixing the air cells 10 forming the shoulder supports A1, and is also a fixing member for fixing the waist air cell 8 forming the lumbar support A3.

The pressure receiving plate 5 configured as described above is attached to a body of the seat back frame Sf1 through coupling wires 5*a* having elasticity. More specifically, the coupling wires 5*a* are locked at the upper portion 5*u* and the lower portion 5*w* of the pressure receiving plate 5. The coupling wire 5*a* locked at the lower portion 5*w* is provided to bridge between the pair of lateral frames 2. Of such a coupling wire 5*a*, respective end portions are hooked on the lateral frames 2, and a center portion is locked at a locking portion (not shown) formed on a back surface of the lower portion 5*w*.

The coupling wire 5*a* locked at the upper portion 5*u* is provided to bridge between the upper frame 1 and the upper portion 5*u*. Of such a coupling wire 5*a*, one end portion is fixed to the upper frame 1, and the other end portion is locked at a locking portion (not shown) formed on a back surface of the upper portion 5*u*. Note that there is no limitation on arrangement of the coupling wire 5*a* locked at the upper portion 5*u*. For example, as illustrated in FIG. 5, such a coupling wire 5*a* may be disposed to hang the pressure receiving plate 5 from above, or may be disposed to extend in the oblique upward direction laterally from the upper portion 5*u* to hang the pressure receiving plate 5.

When receiving pressure from the back of the seated passenger leaning on the seat back S1, the coupling wires 5*a* warp such that the pressure receiving plate 5 fixed to the seat back frame Sf1 through the coupling wires 5*a* moves backward. Thus, the upper body of the seated passenger moderately sinks backward.

In continuous description of the internal structure of the seat back S1, the resin plate 20 formed as a plate-shaped member is disposed at the front position of the air cells 10, the lateral air cells 4, and the waist air cell 8. The resin plate 20 is provided to expand, in a planar shape, a pressing range in pressing of the body of the seated passenger by each air cell. That is, a back surface of the resin plate 20 contacts the air cells, and each air cell expands in contact with a corresponding portion (specifically, the shoulders, the vicinity of the body trunk lateral portions, and the vicinity of the waist) of the body of the seated passenger to press such a corresponding portion at the surface of the resin plate 20.

In more specific description of the configuration of the resin plate 20, the resin plate 20 is divided into the following portions: a portion disposed at the front position of each air cell 10 as a portion of the shoulder support A1; a portion disposed at the front position (in particular, on the inner side in the width direction) of each lateral air cell 4 as a portion of the side support A2; and a portion disposed at the front position of the waist air cell 8 as a portion of the lumbar support A3. Note that in the present embodiment, the above-described three portions are integrally formed to form the single resin plate 20.

In description of each portion of the resin plate 20, the portion disposed at the front position of each air cell 10 as a portion of the shoulder support A1 is provided to expand the area of action of force on the shoulder of the seated passenger in association with expansion of the air cell 10, and is specifically a deformable portion 21 capable of deforming in association with expansion of the air cell 10. The deformable portion 21 is disposed at an upper end portion of the resin plate 20, and is formed in a tail fin shape as viewed from the front side as illustrated in FIG. 4. An inverted triangular cutout 24 is formed downwardly from an upper end of the deformable portion 21 at a center portion of the deformable portion 21 in the width direction. The cutout 24 is formed such that a tip end (a lower end) position thereof is at a position slightly lower than a center position of the deformable portion 21 in the height direction.

With the above-described cutout 24, the deformable portion 21 is separated into two portions with respect to the cutout 24, specifically a one-end-side deformable piece 25 and another-end-side deformable piece 26. The one-end-side deformable piece 25 and the other-end-side deformable piece 26 as the two separated portions are independently deformable. In other words, the cutout 24 is formed between the deformable pieces 25, 26, and is equivalent to a separation portion for separating the deformable pieces 25, 26.

Figure 6:
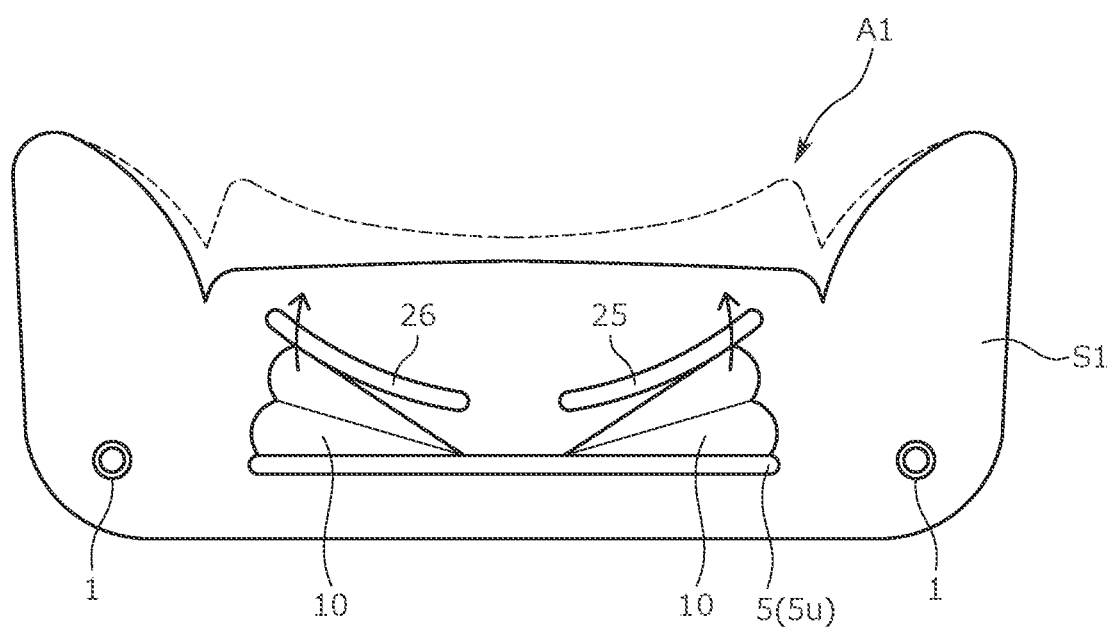
FIG. 6 is a cross-sectional view of shoulder support portions of an example seat back along the horizontal plane, according to an embodiment.
Figure 7:
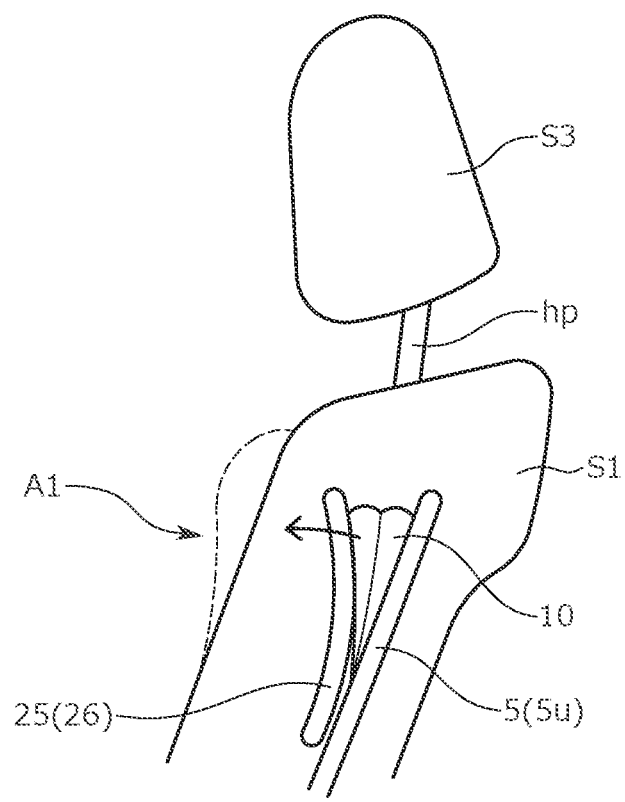
FIG. 7 is a cross-sectional view of the shoulder support portions of the example seat back along the vertical plane, according to an embodiment.

The one-end-side deformable piece 25 and the other-end-side deformable piece 26 are positioned at the back of the shoulders of the seated passenger when the back of the seated passenger leans on the seat back S1. More particularly, the one-end-side deformable piece 25 is positioned at the back of one shoulder of the seated passenger, and the other-end-side deformable piece 26 is positioned at the back of the other shoulder of the seated passenger. That is, each of the one-end-side deformable piece 25 and the other-end-side deformable piece 26 is positioned right in front of a corresponding one of the air cells 10. Each of the one-end-side deformable piece 25 and the other-end-side deformable piece 26 deforms and curves to wrap around a corresponding one of the shoulders of the seated passenger as illustrated in FIGS. 6 and 7 when a corresponding one of the air cells 10 expands. Thus, the shoulder supports A1 press the shoulders of the seated passenger.

A front area of each of the one-end-side deformable piece 25 and the other-end-side deformable piece 26 is larger than the area (in particular, an area contacting the deformable portion 21) of the air cell 10. Thus, force generated by expansion of the air cell 10 is applied to a larger area than the shoulder of the seated passenger. Since the area of action of the force generated by expansion of the air cell 10 is expanded by the resin plate 20 as described above, the shoulders of the seated passenger can be properly pressed even in the case of using a relatively-small air cell 10.

In the present embodiment, since the one-end-side deformable piece 25 and the other-end-side deformable piece 26 are independently deformable as described above, both shoulders of the seated passenger can be independently pressed. As a result, force for pressing the shoulder of the seated passenger to stably hold the posture of the seated passenger can be adjusted separately for the right and left shoulders. Further, as illustrated in FIG. 4, a portion of an outer edge of each of the one-end-side deformable piece 25 and the other-end-side deformable piece 26 is curved in an arc shape along the shoulder of the seated passenger, the outer edge portion being positioned at an upper corner portion. Since a portion of the resin plate 20 positioned at the back of each shoulder of the seated passenger is in the shape along the shoulder of the seated passenger as described above, the shoulder supports A1 more properly push to wrap around the shoulders of the seated passenger.

The portion disposed at the front position of the waist air cell 8 as a portion of the lumbar support A3 is provided to expand the area of action of force on the waist of the seated passenger in association with expansion of the waist air cell 8, and is an extension 22 positioned lower than the deformable portion 21 and extending downward. The extension 22 is narrower than the deformable portion 21, and extends downward to pass between the right and left side supports A2 in a pair in the width direction. Thus, the lumbar support A3 is provided while contact with each side support A2 is reduced, and can push the waist of the seated passenger through the extension 22.

Note that in the present embodiment, a lower end of the extension 22 reaches a position right above the lower coupling frame 3. Moreover, the extension 22 is formed in an arch shape slightly curved in the height direction. Thus, when the lumbar support A3 pushes forward, at the extension 22, the waist of the seated passenger, the waist of the seated passenger can be properly pushed at a relatively-gentle surface.

In the present embodiment, the deformable portion 21 and the extension 22 are adjacent to each other, and a groove 23 linearly formed along the width direction is provided at a boundary position between the deformable portion 21 and the extension 22. Of the resin plate 20, a boundary region between the deformable portion 21 and the extension 22, i.e., respective end portions of a formation region of the groove 23 in the width direction, is provided with substantially triangular cutouts 20a formed inward in the width direction.

The portion disposed at the front position of each lateral air cell 4 as a portion of the side support A2 is provided to expand the area of action of lateral force on the trunk of the body of the seated passenger in association with expansion of the lateral air cell 4, and is a lateral portion 27 positioned on each side of the extension 22. The lateral portion 27 obliquely extends forward from each end of the extension 22 in the width direction, and a front end of the lateral portion 27 reaches the substantially same position as that of a front end of the lateral frame 2. Moreover, the lateral portion 27 also extends in the upper-to-lower direction, and has the substantially same height as that of the extension 22. Further, in the present embodiment, the extension 22 and the lateral portion 27 are adjacent to each other, and a groove 28 linearly formed along the height direction is provided at a boundary position between the extension 22 and the lateral portion 27.

In the present embodiment, the resin plate 20 is supported by the pressure receiving plate 5. That is, the pressure receiving plate 5 functions as the fixing member for fixing the air cells, and also functions as a support body for supporting the resin plate 20. Since the pressure receiving plate 5 is utilized as the support body of the resin plate 20 as described above, the number of components is reduced as compared to the case of separately providing the support body, and therefore, the configuration of the seat back frame Sf1 can be further simplified. The position of a portion of the resin plate 20 supported by the pressure receiving plate 5 is described in detail below.

Fixing Positions of Each Air Cell and Support Positions of Resin Plate

Next, the fixing positions of each air cell and the support positions of the resin plate 20 are described with reference to FIG. 8. Note that the fixing positions of each air cell are indicated by black circles in FIG. 8, and the support positions of the resin plate 20 are indicated by black stars in FIG. 8.

First, the fixing positions of the air cell 10 of the air cells are described, the air cell 10 forming the shoulder support A1. In description of the fixing positions of the air cell 10, the structure of such an air cell is described. The air cell 10 is formed in a substantially rectangular shape as viewed from the front side, and extends along the longitudinal direction thereof. Each end portion of the air cell 10 in the longitudinal direction thereof (in other words, each end portion of the air cell 10 in the extension direction thereof) is provided with a tongue-shaped protrusion 10a extending outward in the transverse direction of the air cell 10. The protrusion 10a is equivalent to a fixing target portion, and forms a seating surface in attachment of a fixture such as a bolt.

The air cell 10 is fixed to the pressure receiving plate 5 with the fixtures attached respectively to the protrusions 10a. Note that in the present embodiment, the single air cell 10 includes two protrusions 10a as described above, and the two protrusions 10a protrude in the same direction.

In description of the fixing positions of the air cell 10, the air cell 10 is fixed to the upper portion 5u of the pressure receiving plate 5. In the present embodiment, the two protrusions 10a provided at each air cell 10 are fixed respectively to fixing positions separated from each other in the width direction. The "fixing position" described herein is the position of a portion (e.g., a bolt hole) of the pressure receiving plate 5 into which the fixture attached to the protrusion 10a of the air cell 10 is fitted.

In specific description with reference to FIG. 8, the air cell 10 in the inclined orientation is fixed to the pressure receiving plate 5 such that one (hereinafter referred to as an "outer end portion") of both end portions of the air cell 10 in the longitudinal direction thereof on the outer side in the width direction is positioned lower than the other end portion (hereinafter referred to as an "inner end portion") on the inner side in the width direction. Moreover, each of the two protrusions 10a extends downward (in particular, inward in the width direction and downward in the upper-to-lower direction). That is, in the present embodiment, the protrusions 10a are provided in a lower region at respective end portions of the air cell 10 in the longitudinal direction thereof.

Moreover, in the present embodiment, the two air cells 10 are arranged symmetrically with respect to the center of the seat back S1 in the width direction, and a slight clearance is formed between the air cells 10. Further, in the present embodiment, the air cells 10 are fixed on the inner side of the outer edge of the upper portion 5u of the pressure receiving plate 5 without protruding outward beyond such an outer edge.

As described above, in the present embodiment, the air cell 10 is fixed at both end portions of the air cell 10 in the longitudinal direction thereof, and therefore, is more stably fixed. The fixing positions of the air cells 10 are at the different positions in the width direction, i.e., the direction along the shoulder width of the seated passenger. Thus, the state, i.e., a fixed state, of each air cell 10 fixed along the shoulder width of the seated passenger is stabilized. With the stable fixed state, the air cells 10 can properly push the shoulders of the seated passenger.

The protrusions 10a as the fixing target portions are provided in the lower region of both end portions of the air cell 10 in the longitudinal direction thereof. Thus, an upper region of the air cell 10 is in an unfixed state, and therefore, easily moves forward in expansion. With this configuration, the upper region of the air cell 10 can expand forward, and as a result, the air cell 10 can press to wrap around a corresponding one of the shoulders of the seated passenger. Note that such an advantageous effect is effectively provided by the air cells 10 fixed to the front surface of the pressure receiving plate 5. That is, the air cells 10 are, in expansion thereof, controlled by the pressure receiving plate 5 to expand forward. As a result, each air cell 10 properly expands to push forward a corresponding one of the shoulders of the seated passenger.

Figure 9:
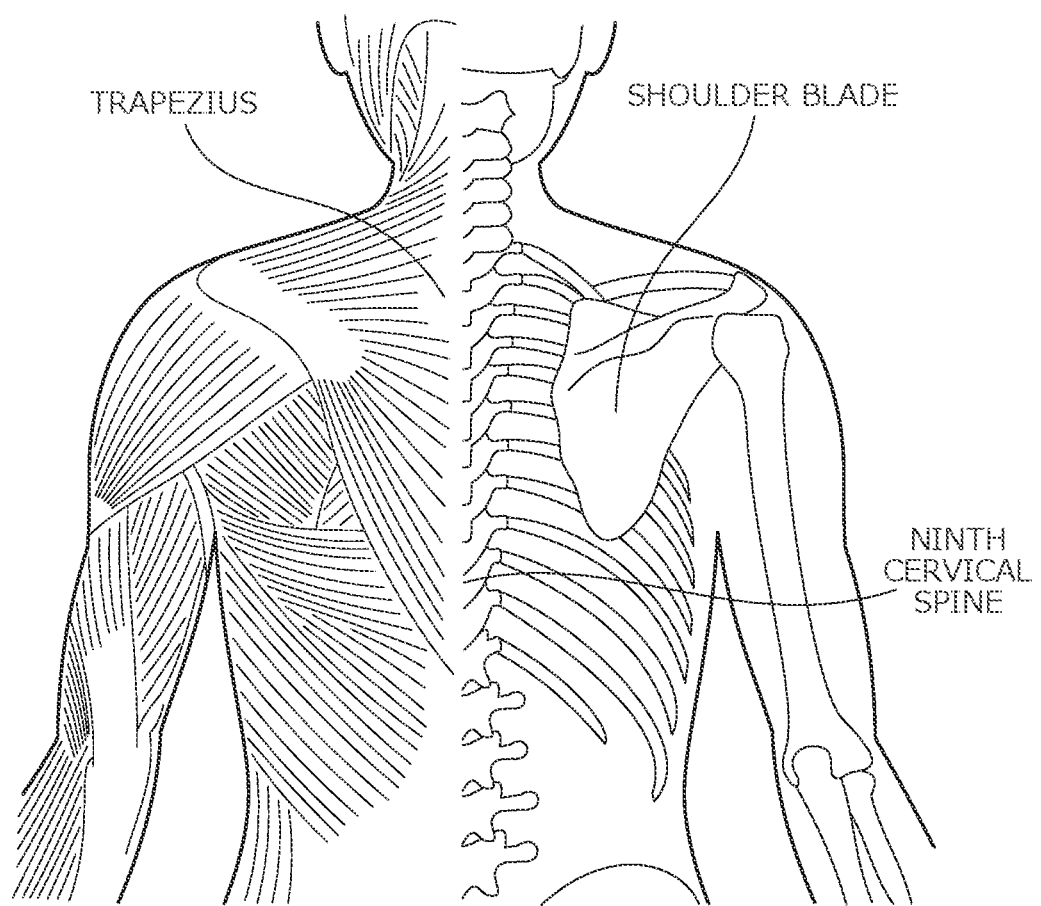
FIG. 9 is a rear view of a skeleton (the right half) and skeletal muscles (the left half) of a human.

For the fixing position of each protrusion 10a of the air cell 10 as described above, a relationship between such a fixing position and the body of the seated passenger is taken into consideration. Of the fixing positions for the protrusions 10a provided at respective end portions of the air cell 10 in the longitudinal direction thereof, the fixing position for the protrusion 10a provided at the inner end portion is, specifically, a position deviating, in both of the height direction and the width direction, from a region corresponding to the shoulder blades of the seated passenger. The "region corresponding to the shoulder blades" as described herein is a space region occupied by the shoulder blades as illustrated in FIG. 9, and the "position deviating from the region corresponding to the shoulder blades" as described herein is a position when each protrusion 10a is disposed not to overlap with a portion or the entirety of the shoulder blades in the front-to-back direction.

Of the fixing positions for the protrusions 10a provided at respective end portions of the air cell 10 in the longitudinal direction thereof, the fixing position for the protrusion 10a provided at the outer end portion is a position deviating, in both of the height direction and the width direction, from a region corresponding to the trapezius of the seated passenger. The "region corresponding to the trapezius" as described herein is a space region occupied by the trapezius as illustrated in FIG. 9, and the "position deviating from the region corresponding to the trapezius" is a position when each protrusion 10a is disposed not to overlap with a portion or the entirety of the trapezius in the front-to-back direction.

Since the above-described positions are set as the fixing positions of the protrusions 10a, a feeling of discomfort of the seated passenger when the above-described fixing positions are at positions overlapping with the shoulder blades in the front-to-back direction or positions overlapping with the trapezius in the front-to-back direction can be reduced.

Further, the arrangement positions of the two air cells 10 are positions deviating, in the width direction, from a region corresponding to the backbone of the seated passenger. The "positions deviating from the region corresponding to the backbone" as described herein are positions when each protrusion 10a is disposed not to overlap with a portion of the backbone in the front-to-back direction. With such a position relationship, the horizontal width (the length in the width direction) of the air cell 10 is more shortened as compared to the case where each air cell 10 reaches the region corresponding to the backbone in the width direction. Thus, the size of the air cell 10 is reduced.

Next, the fixing positions of each lateral air cell 4 forming the side support A2 are described. As in the above-described air cell 10, the lateral air cell 4 is also in a substantially rectangular shape as viewed from the front side, and extends along the longitudinal direction thereof. Each end portion of the lateral air cell 4 in the longitudinal direction thereof is provided with a tongue-shaped protrusion 4a extending outward in the transverse direction of the lateral air cell 4. That is, in the present embodiment, the single lateral air cell 4 includes two protrusions 4a as described above, and the two protrusions 4a protrude in the same direction.

The lateral air cell 4 is fixed in such a posture that the longitudinal direction thereof is along the height direction and that each protrusion 4a extends inward in the width direction. Note that the fixing positions of each of the two protrusions 4a of the lateral air cell 4 is on an inner surface of the lateral frame 2 (in particular, the lateral plate 2a) in the width direction, and the protrusions 4a are arranged in the upper-to-lower direction in the present embodiment.

Next, the fixing positions of the waist air cell 8 forming the lumbar support A3 are described. The waist air cell 8 is formed in a square shape as viewed from the front side, and is, at an upper end thereof, fixed to the pressure receiving plate 5, more specifically the center portion 5v. Note that the fixing positions of the waist air cell 8 on the pressure receiving plate 5 include two points separated from each other in the width direction as illustrated in FIG. 8.

Each air cell at the above-described fixing positions is fixed to a corresponding one of the fixing members (the pressure receiving plate 5 and the lateral frames 2). Note that the fixing position at each of the protrusions 10a, 4a provided at the air cells 10 and the lateral air cells 4 is a position apart from the shape sensor 40 and the body pressure sensors 41 as illustrated in FIG. 10. With such a position relationship, the air cells 10 and the lateral air cells 4 can properly fixed without influencing measurement made by the shape sensor 40 and the body pressure sensors 41.

FIG. 10 is a view of the arrangement positions of the sensors provided at the seat back S1, and in this figure, the air cells 10 and the lateral air cells 4 are each indicated by a dashed line for the purpose of showing the position relationship with the fixing positions of each of these air cells. Note that FIG. 10 is schematically illustrated for the sake of easy understanding of description, and in this figure, a configuration (e.g., the pillar support portions 7 are omitted from FIG. 10) slightly different from an actual structure is illustrated. Moreover, in FIG. 10, the fixing positions of each air cell are indicated by dashed circles.

Next, the support positions of the resin plate 20 are described. The resin plate 20 is supported by the pressure receiving plate 5 as described above, and more specifically, is attached to the front surface of the pressure receiving plate 5 (in particular, the center portion 5v) with, e.g., screws. In the present embodiment, the portion of the resin plate 20 supported by the pressure receiving plate 5 is a boundary portion between the deformable portion 21 and the extension 22, more specifically a portion provided with the above-described groove 23. Since the resin plate 20 is, as described above, supported by the pressure receiving plate 5 at the boundary portion between the deformable portion 21 and the extension 22, the resin plate 20 can be properly supported without difficulty when the deformable portion 21 and the extension 22 push the body of the seated passenger. Of the resin plate 20, the portion provided with the groove 23 as a bending start point particularly includes the support positions, and therefore, the difficulty when the deformable portion 21 and the extension 22 push the body of the seated passenger can be more effectively reduced.

In the present embodiment, the position of the portion of the resin plate 20 supported by the pressure receiving plate 5 is a position reaching, in both of the height direction and the width direction, a region corresponding to the ninth cervical spine of the seated passenger. The "region corresponding to the ninth cervical spine" as described herein is a space region occupied by the ninth cervical spine illustrated in FIG. 9, and the "position reaching the region corresponding to the ninth cervical spine" is a position when disposed to overlap with a portion or the entirety of the ninth cervical spine in the front-to-back direction. With such a position relationship, the resin plate 20 can be more stably supported.

More specifically, at the position of the ninth cervical spine, a displacement when the seating posture of the seated passenger changes is smaller than that at other portions (i.e., a displacement at other portions of the thoracic vertebra). Thus, as long as each support position of the resin plate 20 reaches the region corresponding to the ninth cervical spine, a support state of the resin plate 20 can be further stabilized.

Figure 8:
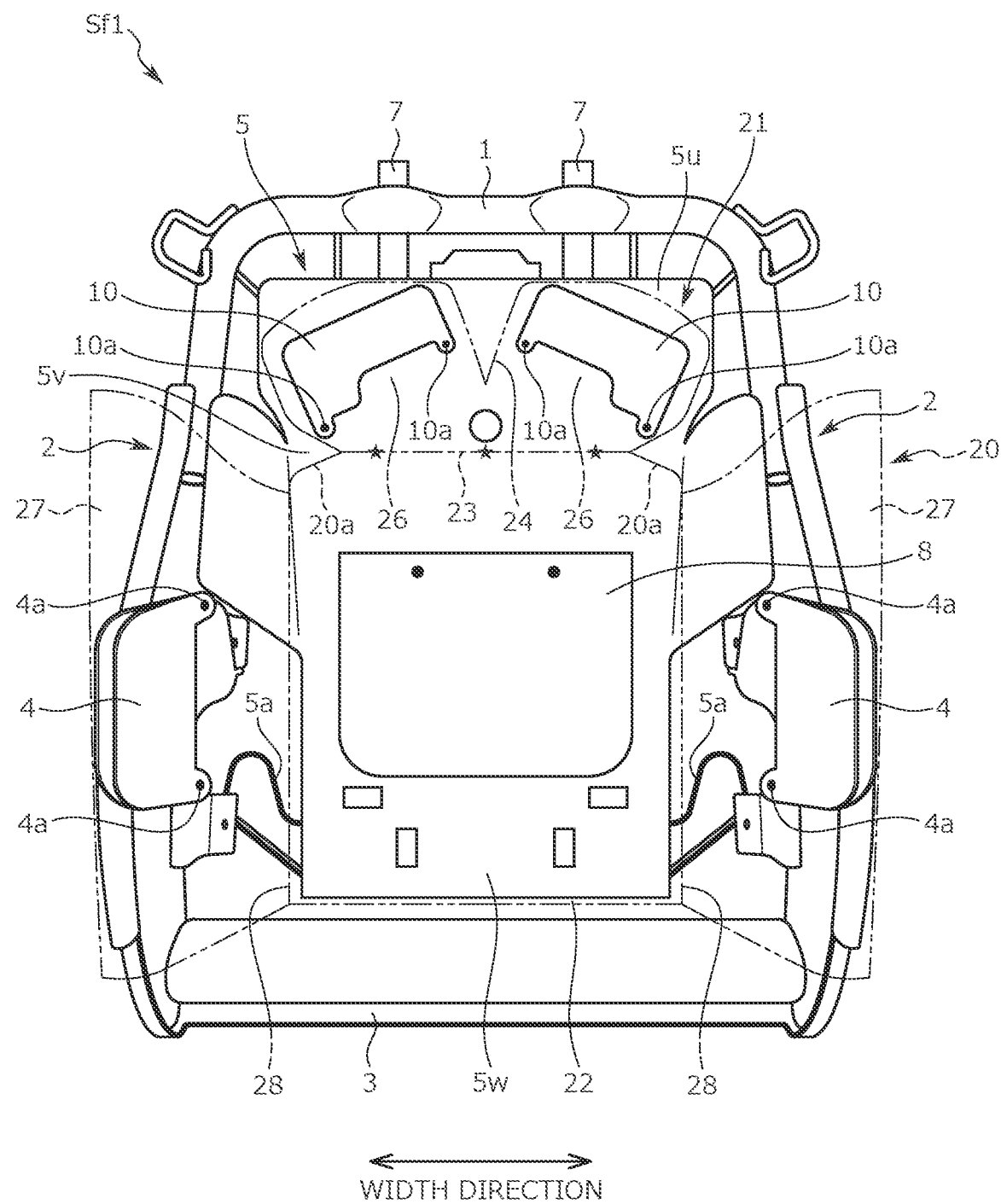
FIG. 8 is a front schematic view of example fixing positions of each bag body and support positions of the plate-shaped member, according to an embodiment.

In the present embodiment, the support positions of the resin plate 20 are, as illustrated in FIG. 8, at plural points (three points in the case illustrated in FIG. 8) in a line along the width direction. As illustrated in this figure, each support position of the resin plate 20 and the fixing positions of each air cell 10 on the pressure receiving plate 5 are positions different from each other in the width direction. With such a position relationship, contact between the portion of the resin plate 20 supported by the pressure receiving plate 5 and each air cell 10 is, in the present embodiment, reduced so that the resin plate 20 can be more properly supported.

Further, each support position of the resin plate 20 is the position apart from the shape sensor 40 and the body pressure sensors 41 as illustrated in FIG. 10. With such a position relationship, the resin plate 20 can be properly supported without influencing measurement made by the shape sensor 40 and the body pressure sensors 41. Note that in FIG. 10, only the deformable portion 21 and the extension 22 of the resin plate 20 are indicated by dashed lines, and the lateral portions 27 are omitted. Moreover, in FIG. 10, each support position of the resin plate 20 is indicated by a dashed star.

In the present embodiment, the member for fixing the air cells 10 and the support body of the resin plate 20 are formed of the same member, specifically the single pressure receiving plate 5. However, the present disclosure is not limited to such a configuration. For example, as illustrated in FIG. 11, the member for fixing the air cells 10 and the support body of the resin plate 20 may be separately prepared as individual bodies.

Figure 11:
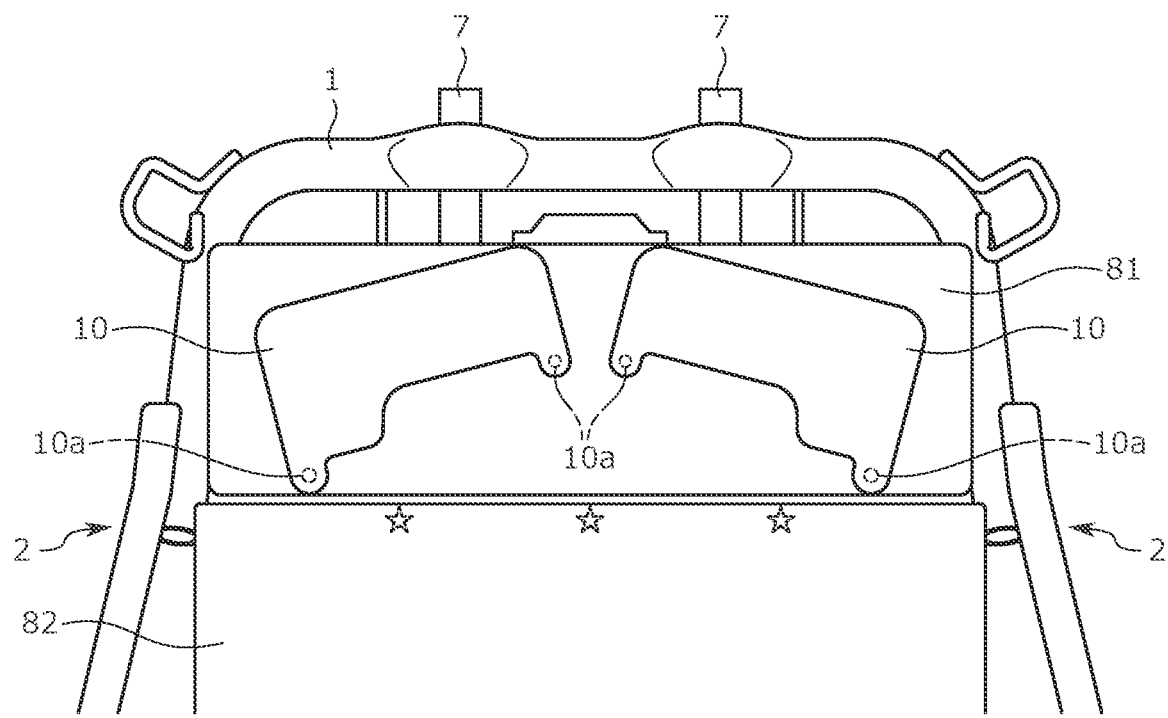
FIG. 11 is a front schematic view of an example variation of a fixing structure of the bag body, according to an embodiment.

In description of the configuration of FIG. 11, the member for fixing the air cells 10 is formed of a plate-shaped first plate member 81, and the support body of the resin plate 20 is formed of a second plate member 82. The first plate member 81 is tall to some extent in the height direction, and bridges between the pair of lateral frames 2 in the width direction. The air cells 10 are fixed to a front surface of the first plate member 81. That is, the first plate member 81 is equivalent to the upper portion 5u of the pressure receiving plate 5, and the air cells 10 are fixed at similar fixing positions by a similar fixing method as in the case of using the pressure receiving plate 5 as the fixing member.

Note that the fixing position (indicated by a dashed circle in FIG. 11), which is included in the fixing positions for the protrusions 10a provided at respective end portions of the air cell 10 in the longitudinal direction thereof and which is for the protrusion 10a on the lower side, is in a lower region of the front surface of the first plate member 81 as illustrated in FIG. 11. With this configuration, the height (the length in the upper-to-lower direction) of the first plate member 81 is more shortened as compared to the case where the above-described fixing positions are in a center region of the front surface of the first plate member 81. As a result, an increase in the size of the first plate member 81 can be suppressed.

The second plate member 82 is, to some extent, separated from the first plate member 81 on the lower side thereof, and extends downward. The resin plate 20 is attached to a front surface of the second plate member 82, and therefore, is supported by the second plate member 82. That is, the second plate member 82 is equivalent to the center portion 5v of the pressure receiving plate 5, and supports the resin plate 20 at similar support positions by a similar support method as in the case of using the pressure receiving plate 5 as the support body.

Note that the support positions (indicated by dashed stars in FIG. 11) of the resin plate 20 on the second plate member 82 are at an upper end portion of the second plate member 82 as illustrated in FIG. 11, and are at plural points (three points in the case illustrated in FIG. 11) in a line along the width direction, for example. In the present embodiment, the fixing positions of the air cells 10 on the first plate member 81 and each support position of the resin plate 20 on the second plate member 82 are preferably positions different from each other in the width direction. That is, the above-described position relationship reduces contact between a portion of the resin plate 20 supported by the second plate member 82 and each air cell 10, and the resin plate 20 is properly supported.

As described above, other plate-shaped members than the pressure receiving plate 5 may be used as the member for fixing the air cells 10, but members other than the plate-shaped member may be used. For example, the air cells 10 may be fixed to an elastic member bridging between the lateral frames 2, specifically a spring member (e.g., an S-spring).

Position Relationship Among Air Cells and Resin Plate

Figure 12:
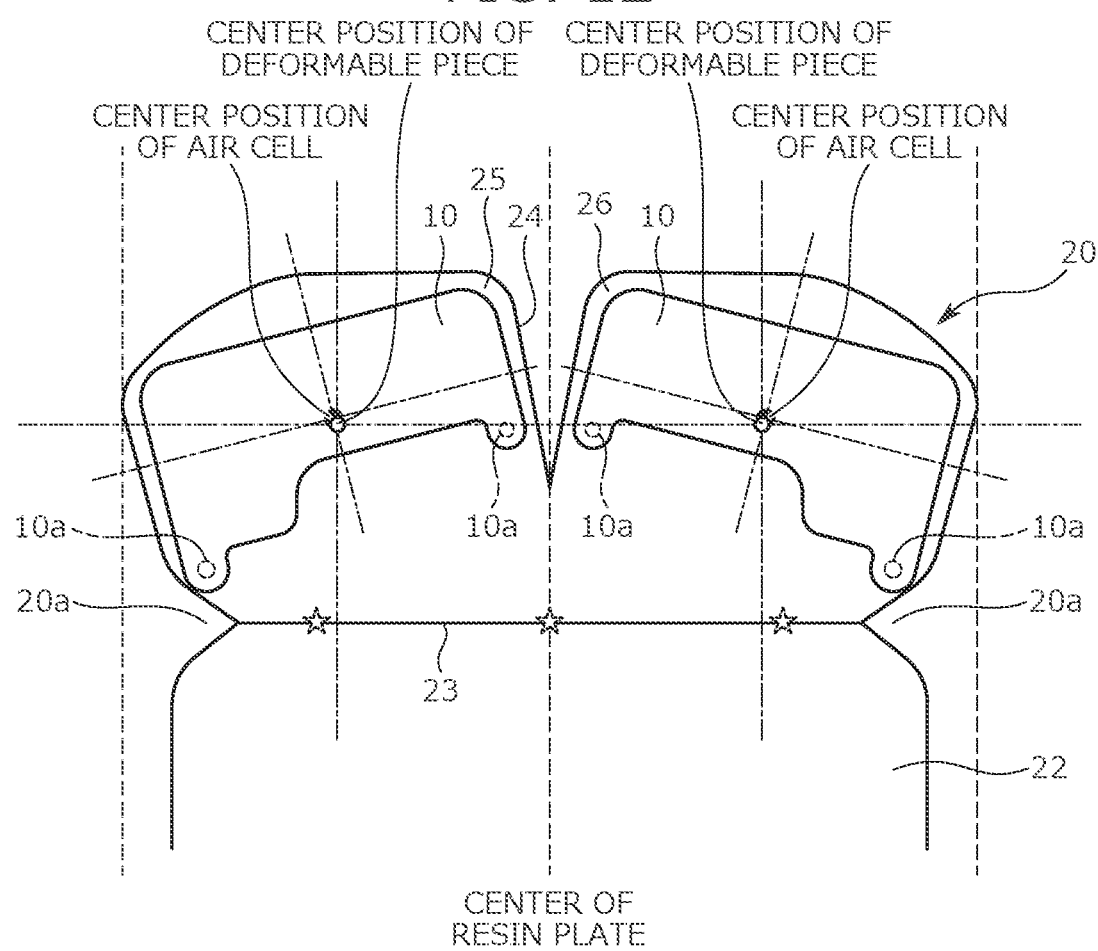
FIG. 12 is a front schematic view of an example position relationship among the bag bodies and the plate-shaped member at the shoulder support portions, according to an embodiment.

Next, a position relationship between each air cell 10 forming the shoulder support A1 and the deformable portion 21 of the resin plate 20 is described with reference to FIG. 12. FIG. 12 is a view of the position relationship between each air cell 10 and the deformable portion 21. Note that for the sake of easy understanding of description, only the air cells 10 and the resin plate 20 are illustrated in FIG. 12. When a position relationship between the one-end-side deformable piece 25 and the air cell 10 is horizontally reversed, such a reversed position relationship is coincident with a position relationship between the other-end-side deformable piece 26 and the air cell 10. For this reason, only the position relationship between the one-end-side deformable piece 25 and the air cell 10 is described below.

As illustrated in FIG. 12, the air cell 10 and the one-end-side deformable piece 25 are arranged such that the center positions thereof are substantially coincident with each other. The "center position" of the air cell 10 as described herein is a center position in both of the longitudinal direction and the transverse direction (the direction perpendicular to the longitudinal direction) of the air cell 10. Moreover, the "center position" of the one-end-side deformable piece 25 is the center position of the one-end-side deformable piece 25 in both of the width direction and the height direction. Note that one end of the one-end-side deformable piece 25 in the width direction corresponds to an outermost portion of the one-end-side deformable piece 25 in the width direction, and the other end of the one-end-side deformable piece 25 in the width direction corresponds to a portion where a tip end of the above-described cutout 24 is positioned.

On the other hand, each air cell 10 is fixed to the pressure receiving plate 5 at the protrusions 10a provided in the lower region at respective end portions of such an air cell 10 in the longitudinal direction thereof. The "lower region" described herein is a region positioned on the lower side when the air cell 10 is divided by a virtual line passing through the center position of the air cell 10 along the longitudinal direction thereof. Conversely, the "upper region" is a region positioned on the upper side when the air cell 10 is divided by the above-described virtual line.

An air supply port (not shown) provided at each air cell 10 is positioned at a point substantially coincident with the center position of the air cell 10 as viewed from the front side. Thus, the air cell 10 begins expanding preferentially from the center position of the air cell 10. Thus, when the air cell 10 expands, the unfixed upper region selectively deforms. Of the one-end-side deformable piece 25 deforming in association with expansion of the air cell 10, a portion corresponding to the upper region, specifically a portion positioned on the upper side with respect to the center position of the one-end-side deformable piece 25, deforms forward.

Further, in the present embodiment, each air cell 10 is fixed in such an inclined orientation that the outer end portion of both end portions of the air cell 10 in the longitudinal direction thereof is positioned lower than the inner end portion. Thus, when the one-end-side deformable piece 25 deforms in association with expansion of the air cell 10, the one-end-side deformable piece 25 bends starting from a broken line passing through the center position of the one-end-side deformable piece 25 along the longitudinal direction of the air cell 10 in the inclined orientation. Accordingly, the force containing the inward component in the width direction and the downward component in the width direction acts on the shoulders of the seated passenger from the shoulder supports A1 of the seat back S1. As a result, the shoulders of the seated passenger are held with the shoulder supports A1 wrapping around the shoulders, and therefore, the seating posture is stabilized.

Method for Fixing Air Cell at Ottoman Portion

Next, the method for fixing the air cell, i.e., the ottoman air cell 30, at the ottoman portion A4 is described. In description of the method for fixing the ottoman air cell 30, the band-shaped member (hereinafter referred to as a "band-shaped support member 31") provided at the front position of the ottoman air cell 30 is described. The band-shaped support member 31 is lifted up when the ottoman air cell 30 expands, and the knees of the legs of the seated passenger are placed on a front surface (an upper surface) of the band-shaped support member 31.

Figure 13:
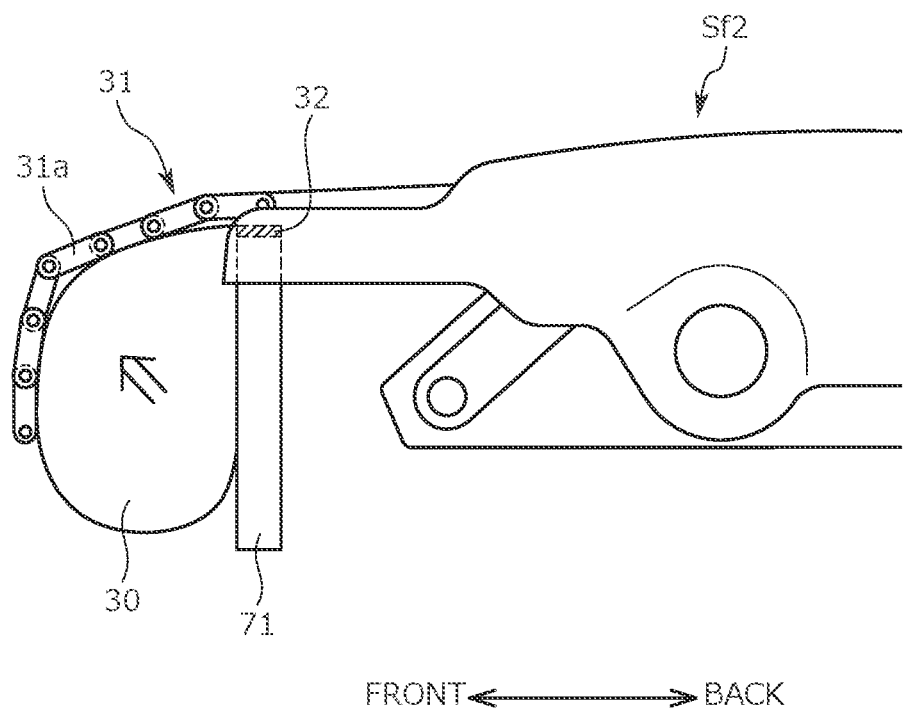
FIG. 13 is a side schematic view of an example mechanism configured to support the knees of the legs of the seated passenger (No. 1), according to an embodiment.

In the present embodiment, the band-shaped support member 31 includes a plurality of links 31a coupled together. Each link 31a is formed of a metal body elongated in the width direction, and adjacent ones of the links 31a are coupled together with a hinge such that one of the links 31a is rotatable relative to the other one of the links 31a. The coupled links 31a expand in a canopy shape to form the band-shaped support member 31. When the ottoman air cell 30 expands, the band-shaped support member 31 configured as described above supports the knees of the legs of the seated passenger at a flat support surface formed by the continuously-coupled links 31a as illustrated in FIG. 13.

Figure 14:
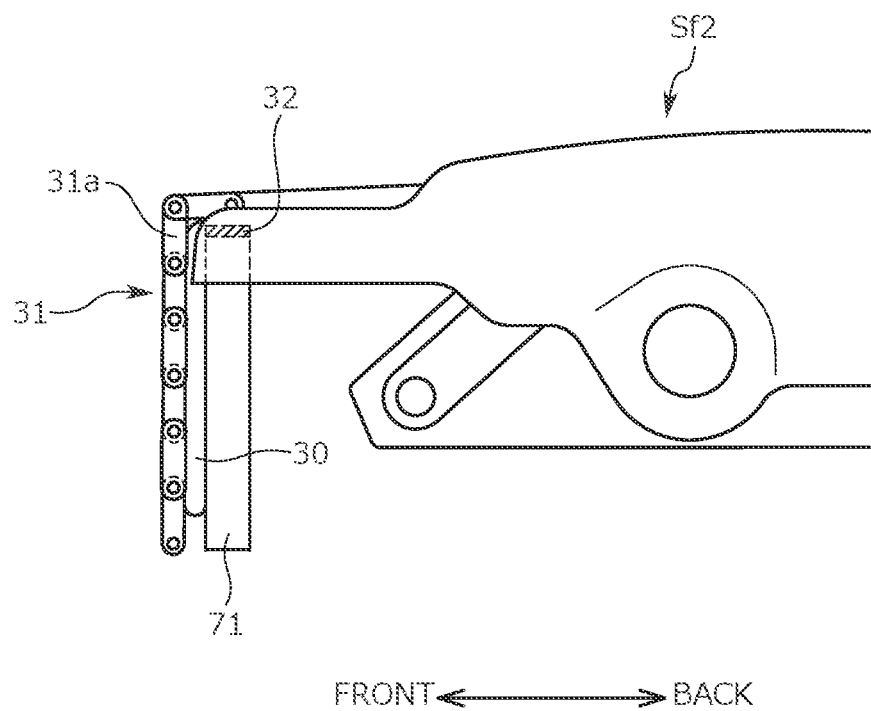
FIG. 14 is a side schematic view of the example mechanism configured to support the knees of the legs of the seated passenger (No. 2), according to an embodiment.

On the other hand, the ottoman air cell 30 is, in the front-to-back direction, interposed between the band-shaped support member 31 and a suspending wall 71 provided at a front end portion of a cushion frame Sf2 forming a framework of the seat cushion S2, as illustrated in FIG. 14. Moreover, an upper end portion of the ottoman air cell 30 is provided with a protrusion 32, and is fixed to the suspending wall 71 with a fixture such as a screw attached to the protrusion 32. Note that the above-described protrusion 32 is a sheet-shaped portion having flexibility, and is freely bendable.

In the present embodiment, in order to dispose an expandable/contractible air cell body of the ottoman air cell 30 on the upper side such that the air cell body is positioned as close as possible to the legs of the seated passenger, the protrusion 32 is fixed to an upper end surface of the suspending wall 71 with the protrusion 32 being bent backward. With this configuration, the ottoman air cell 30 can be disposed on the more upper side as compared to the configuration in which the protrusion 32 is fixed to a front surface of the suspending wall 71. Moreover, the fixing method employed as described above allows the air cell body to expand in an upper forward direction (indicated by an arrow in FIG. 13), and as a result, the knees of the legs of the seated passenger can be properly supported.

Figure 15:
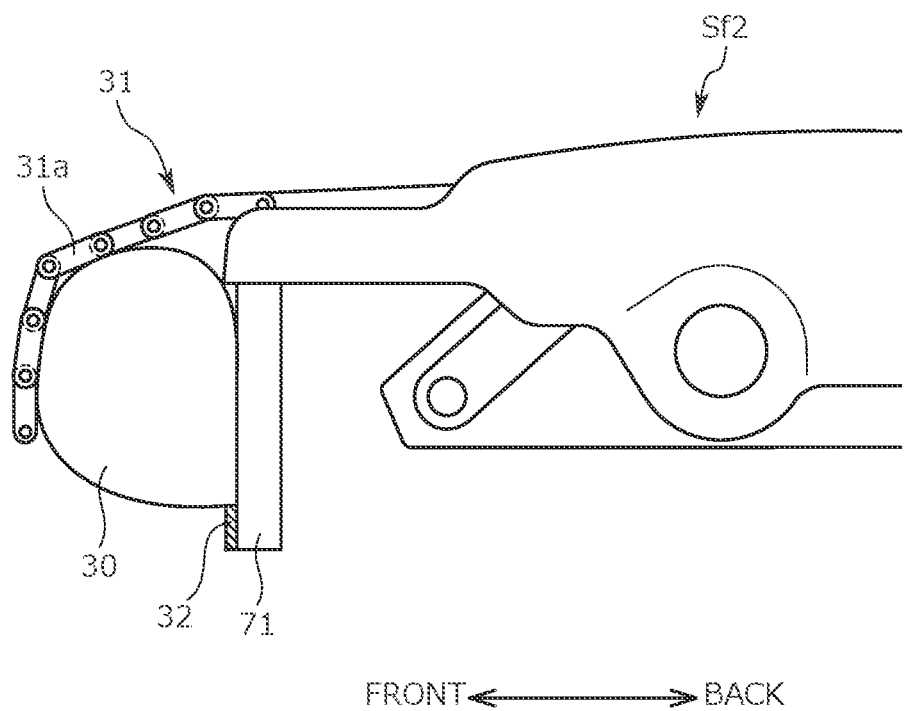
FIG. 15 is a side schematic view of an example variation of the mechanism configured to support the knees of the legs of the seated passenger, according to an embodiment.

Note that the method for fixing the ottoman air cell 30 is not limited to the above-described contents, and for example, may be configured as illustrated in FIG. 15. In the configuration illustrated in FIG. 15, the above-described protrusion 32 is provided at a lower end portion of the ottoman air cell 30. The protrusion 32 is fixed to the front surface of the suspending wall 71. Since the protrusion 32 is provided at the lower end portion of the ottoman air cell 30 as described above, an upper end of the ottoman air cell 30 can be disposed on the more upper side. Moreover, an upper portion of the ottoman air cell 30 is not fixed, and therefore, the ottoman air cell 30 easily expands forward in expansion. With this configuration, the air cell body is closer to the knees of the legs of the seated passenger, and as a result, the knees of the legs of the seated passenger can be properly supported.

TABLE OF REFERENCE NUMERALS

- 1: upper frame
- 2: lateral frame
  - 2a: lateral plate
  - 2b: front edge portion
- 3: lower coupling frame
- 4: lateral air cell
  - 4a: protrusion
  - 4b: concave portion
- 5: pressure receiving plate (fixing member, support body)
  - 5a: coupling wire
  - 5b: attachment position
  - 5c: lateral extension
  - 5u: upper portion
  - 5v: center portion
  - 5w: lower portion
- 6: partition portion
- 7: pillar support portion
- 8: waist air cell
- 10: air cell (bag body, shoulder air cell, right bag body, left bag body)
  - 10a: protrusion (fixing target portion)
  - 10a1: inner fixing target portion
  - 10a2: outer fixing target portion, lower fixing target portion
  - 10b: recessed portion
  - 10c1: first transverse side
  - 10c2: second transverse side
  - 10d1: innermost portion of first transverse side
  - 10d2: innermost portion of second transverse side
  - 10d3: outermost portion of second transverse side
  - 10e1: first longitudinal side portion
  - 10e2: second longitudinal side portion
- 20: resin plate (plate-shaped member, resin support member)
  - 20a: cutout
- 21: deformable portion
- 22: extension
- 23: groove
- 24: cutout (separation)
- 25: one-end-side deformable piece (left separated portion)
- 26: other-end-side deformable piece (right separated portion)
- 27: lateral portion
- 28: groove
- 30: ottoman air cell
- 31: band-shaped support member
  - 31a: link
- 32: protrusion
- 40: shape sensor
- 41: body pressure sensor
  - 41a: detector
  - 41b: transmission path
- 42: capacitance sensor
- 50: controller
- 52: compressor (driving part)
- 53: air supply passage (driving part)
- 54: electromagnetic valve (driving part)
- 71: suspending wall TABLE OF REFERENCE NUMERALS-continued

- A1: shoulder support (shoulder support portion, moveable part)
- A2: side support (movable part)
- A3: lumbar support (movable part)
- A4: ottoman portion (movable part)
- CS: control system
- hp: head rest pillar
- P1: pad material
- S: present seat (vehicle seat)
- S1: seat back
- S2: seat cushion
- S3: head rest
- Sf1: seat back frame
- Sf2: cushion frame

The invention claimed is:

1. A vehicle seat, comprising:
a seat back;
wherein:
the seat back comprises:
a pillar support portion configured to support a head rest pillar;
a shoulder support portion configured to support shoulders of a seated passenger; and
a bag body configured to expand by injection of fluid to expand the shoulder support potion,
the bag body includes a right bag body arranged on a right side in the seat back in a seat front view and a left bag body arranged on a left side in the seat back in the seat front view,
each of the right and left bag bodies includes transverse sides at both end portions in a longitudinal direction thereof, the transverse sides extending in a transverse direction that transverses the longitudinal direction,
the transverse sides are straight lines inclined with respect to a vertical direction,
a support body is provided in the seat back,
the each of the right and left bag bodies comprises fixing target portions at which the each of the right and left bag bodies is fixed to the support body,
the fixing target portions include tongue-shaped protrusions extending downward along the transverse direction and provided at the both end portions of the each of the right and left bag bodies in the longitudinal direction and at a lower end portion of the each of the right and left bag bodies,
an upper region of the each of the right and left bag bodies is not fixed, and
the each of the right and left bag bodies is configured to expand to project toward a seated passenger side by the injection of the fluid.

\* \* \* \* \*